United States Patent
Lee et al.

(10) Patent No.: US 10,069,345 B2
(45) Date of Patent: Sep. 4, 2018

(54) METHOD OF MANAGING POWER USING WIRELESS CHARGING SYSTEM, AND APPARATUS AND SYSTEM THEREFOR

(71) Applicant: LG INNOTEK CO., LTD., Seoul (KR)

(72) Inventors: Jae Kyu Lee, Seoul (KR); Yong Il Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 303 days.

(21) Appl. No.: 15/175,592

(22) Filed: Jun. 7, 2016

(65) Prior Publication Data
US 2016/0359375 A1 Dec. 8, 2016

(30) Foreign Application Priority Data
Jun. 8, 2015 (KR) ........................ 10-2015-0080663

(51) Int. Cl.
| | |
|---|---|
| *H02J 50/12* | (2016.01) |
| *H02J 7/02* | (2016.01) |
| *H02J 7/00* | (2006.01) |
| *H02J 7/04* | (2006.01) |
| *H02J 50/40* | (2016.01) |
| *H02J 50/80* | (2016.01) |
| *H02J 50/10* | (2016.01) |
| *H02J 50/20* | (2016.01) |

(52) U.S. Cl.
CPC .......... *H02J 50/12* (2016.02); *H02J 7/0029* (2013.01); *H02J 7/0047* (2013.01); *H02J 7/025* (2013.01); *H02J 7/045* (2013.01); *H02J 50/40* (2016.02); *H02J 50/80* (2016.02); *H02J 50/10* (2016.02); *H02J 50/20* (2016.02); *H02J 2007/0039* (2013.01); *H02J 2007/0049* (2013.01); *H02J 2007/0096* (2013.01)

(58) Field of Classification Search
CPC .... H02J 2007/0096; H02J 50/10; H02J 50/40; H02J 50/80
See application file for complete search history.

(56) References Cited

FOREIGN PATENT DOCUMENTS

| | | |
|---|---|---|
| JP | 2015-42050 A | 3/2015 |
| KR | 10-2012-0137405 A | 12/2012 |
| KR | 10-2013-0069346 A | 6/2013 |
| KR | 10-2015-0009769 A | 1/2015 |
| KR | 10-2015-0032529 A | 3/2015 |

*Primary Examiner* — Robert Deberadinis
(74) *Attorney, Agent, or Firm* — Birch, Stewart, Kolasch & Birch, LLP

(57) ABSTRACT

Disclosed are a method of managing power using a wireless charging system, and an apparatus and system therefor. The wireless power management method in a wireless power transmitter for supplying power to at least one user device including a wireless power receiver installed therein includes receiving first to $n^{th}$ state information items corresponding to the at least one user device, respectively, calculating first statistical information based on the first to $n^{th}$ state information items, and transmitting the first statistical information to a server connected via a network. Accordingly, an effective wireless power management method in a wireless charging system is provided.

20 Claims, 9 Drawing Sheets

METHOD OF MANAGING POWER USING WIRELESS CHARGING SYSTEM, AND APPARATUS AND SYSTEM THEREFOR

CROSS REFERENCE TO RELATED APPLICATION

This application claims priority under 35 U.S.C. § 119 to Korean Patent Application No 10-2015-0080663, filed in Korea on Jun. 8, 2015, which are hereby incorporated in its entirety by reference as if fully set forth herein.

TECHNICAL FIELD

Embodiments relate to wireless charging technology, and more particularly, to a wireless power management method using a wireless charging system, and an apparatus and system therefor.

BACKGROUND

Recently, with development of information and communication technology, a society based on ubiquitous information and communication technology has been formed.

In order to connect information and communication apparatuses anywhere and at anytime, sensors each having computer chip having a communication function need to be installed in all social facilities. Accordingly, problems related to supply of power to such apparatuses or sensors have newly arisen. In addition, as portable apparatuses such as mobile phones, Bluetooth handsets and music players such as iPod have rapidly increased, it takes time and effort for a user to charge batteries. As a method for solving such a problem, recently, wireless power transmission technology is attracting considerable attention.

Wireless power transmission or wireless energy transfer technology refers to technology of wirelessly transmitting electric energy from a transmitter to a receiver using the principle of magnetic induction. In the 1800s, electrical motors or transformers using the principle of electromagnetic induction already started to be used and then methods of radiating radio waves or electromagnetic waves such as lasers and transmitting electric energy were also attempted. Commonly used electric toothbrushes or electric razors are charged using the principle of electromagnetic induction.

Up to now, a wireless energy transfer method may be roughly divided into a magnetic induction method, an electromagnetic resonance method and a radio frequency (RF) transmission method using a short-wavelength radio frequency.

The magnetic induction method refers to technology of using a phenomenon that, when two coils are adjacently placed and current is supplied to one coil, a magnetic flux is generated to generate electromotive force in the other coil, and is commercially available in small apparatuses such as mobile phones. The magnetic induction method may transmit power of a maximum of several kilowatts (kW) and has high efficiency. However, since a maximum transmission distance is 1 cm or less, an apparatus needs to be generally located to be adjacent to a charger or the ground.

The electromagnetic resonance method uses an electric field or a magnetic field instead of electromagnetic waves or current. The electromagnetic resonance method is hardly influenced by an electromagnetic wave and thus is harmless to other electronic apparatuses and humans. In contrast, the electromagnetic resonance method may be used at a limited distance and in a limited space and energy transfer efficiency is slightly low.

The short-wavelength wireless power transmission method—briefly referred to as an RF method—uses a method of directly transmitting and receiving energy in the form of radio waves. This technology is an RF type wireless power transmission method using a rectenna. Rectenna is a compound word of "antenna" and "rectifier" and means an element for directly converting RF power into direct current (DC) power. That is, the RF method is technology of converting AC radio waves into DC radio waves and using DC radio waves and, recently, research into commercialization thereof has been actively conducted as efficiency is improved.

Wireless power transmission technology may be variously used in IT, railroad and consumer-electronics in addition to the mobile industry.

According to conventional smart home technologies, it is possible to collect information on power consumption of home appliances, to calculate expenses according to the collected power consumption information and to check the calculated expenses through a user terminal or a monitoring terminal installed at home.

However, conventionally, there is not provided a method and system for effectively managing power consumption of electronic apparatuses having a charging function as well as for collecting information on power consumption of home appliances connected through a power cable.

SUMMARY

Embodiments provide a wireless power management method using a wireless charging system, and an apparatus and system therefor.

Embodiments provide a wireless power management method using a wireless charging system, and an apparatus and system therefor, for calculating and collecting wireless charging efficiency in real time in units of a wireless power transmitter and a wireless power receiver through a wireless charging system connected to a network so as to optimize a wireless charging system.

Embodiments provide a wireless power management method using a wireless charging system, and an apparatus and system therefor, for providing statistical information for each device, collected through a wireless charging system connected via a network.

Further, embodiments provide a wireless power management method using a wireless charging system, and an apparatus and system therefor, for monitoring a wireless charging state of wireless charging devices installed in home in real time.

Additional advantages, objects, and features of embodiments of the disclosure will be set forth in part in the description which follows and in part will become apparent to those having ordinary skill in the art upon examination of the following or may be learned from practice of embodiments of the disclosure. The objectives and other advantages of embodiments of the disclosure may be realized and attained by the structure particularly pointed out in the written description and claims hereof as well as the appended drawings.

Embodiments of the disclosure provide a wireless power management method using a wireless charging system, and an apparatus and system therefor In one embodiment, a wireless power management method in a wireless power transmitter for supplying power to at least one user device including a wireless power receiver installed therein includes receiving first to $n^{th}$ state information items corresponding to the at least one user device, respectively, calculating first statistical information based on the first to $n^{th}$ state information items, transmitting the first statistical information to a server connected via a network.

The first statistical information may be collected in a unit of the user device, and the information collected in a unit of the user device may include at least one of information on power consumption per unit time, information on load charging efficiency, information on a current charge of the load, and information on estimated time of charging completion of the load.

The first statistical information may be further collected in a unit of the wireless power transmitter, and the information collected in a unit of the wireless power transmitter may include at least one of information on average power transmission efficiency per unit time, information on average charging efficiency of all user devices connected per unit time; information on a whole power amount output from the wireless power transmitter per unit time, and statistical information on permission and denial of a power transmission request from the user device.

The method may further include determining whether an area corresponding to the wireless power transmitter is a shadow area based on the information collected in a unit of the wireless power transmitter.

The shadow area may be determined by any one of the server and the wireless power transmitter.

The method may further include determining whether the wireless power transmitter is added/removed/changed to/from/to a home network with the wireless power transmitter connected thereto based on the information collected in a unit of the wireless power transmitter.

The method may further include controlling at least one of maximum output power of the wireless power transmitter and a maximum number of connectable wireless power receivers of the wireless power transmitter based on the information collected in a unit of the wireless power transmitter.

The state information may include at least one of information on intensity of power applied to the user device, information on intensity of power at a rear end of a rectifier of the wireless power receiver, charging state information, system error information, information on a maximum charge of a load, and information on a current charge of the load.

The wireless power transmitter may transmit the power using at least one of a magnetic induction method, an electromagnetic resonance method, and a radio frequency (RF) method.

The method may further include receiving second to $k^{th}$ statistical information items corresponding to adjacent wireless power transmitters connected to the network, wherein power consumption and estimated electric charges during a unit period corresponding to the network are calculated based on the first to $k^{th}$ statistical information items.

In another embodiment, a wireless power management method in a server connected to at least one wireless power transmitter through a home network includes receiving statistical information collected by each wireless power transmitter, determining a wireless power supply shadow area based on the statistical information, and transmitting a result of the determining to a predetermined customer terminal.

The statistical, information may include information collected in a unit a user device for wirelessly receiving power from the wireless power transmitter.

The information collected in a unit of the user device may include at least one of a number of times that a power transmission request is received per unit time, information on power consumption per unit time, information on load charging efficiency, information on a current charge of the load, and information on estimated time of charging completion of the load.

The statistical information may be calculated based on the information collected in a unit of the user device and may include at least one of information on average power transmission efficiency per unit time, information on average charging efficiency of all user devices connected to the wireless power transmitter per unit time, information on a whole power amount output from the wireless power transmitter per unit time, and statistical information on permission and denial of a power transmission request from the user device.

The method may further include identifying a complexly charged user device based on the statistical information, and transmitting a result of the identifying to the customer terminal.

The method may further include controlling maximum output power of the wireless power transmitter based on the statistical information.

The method may further include calculating power consumption and estimated electric charges during a unit period corresponding to the network using the statistical information.

In another embodiment, a computer readable recording medium having recorded thereon a program for executing any one of the above wireless power management methods.

In another embodiment, a wireless power transmitter for wirelessly supplying power to at least one user device including a wireless power receiver installed therein includes a first communicator configured to receive first to $n^{th}$ state information items corresponding to the at least one user device, respectively, a controller configured to calculate first statistical information based on the first to $n^{th}$ state information items, and a second communicator configured to transmit the first statistical information to a server connected via a network.

In another embodiment, a wireless power management apparatus connected to at least one wireless power transmitter through a home network includes a device configured to receive statistical information collected by each wireless power transmitter, a device configured to determine a wireless power supply shadow area based on the statistical information, and a device configured to transmit a result of the determining to a predetermined customer terminal.

In another embodiment, a wireless power management system includes first to $n^{th}$ wireless power receivers configured to wirelessly receive power, first to $k^{th}$ wireless power transmitters configure to supply the power to the first to $n^{th}$ wireless power receivers and to receive state information from the first to $n^{th}$ wireless power receivers to generate statistical information, and a server configured to determine a wireless power supply shadow area based on the statistical information received from the first to $k^{th}$ wireless power transmitters.

It is to be understood that both the foregoing general description and the following detailed description of embodiments of the disclosure are exemplary and explanatory and are intended to provide further explanation of the disclosure as claimed.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Figure 1:
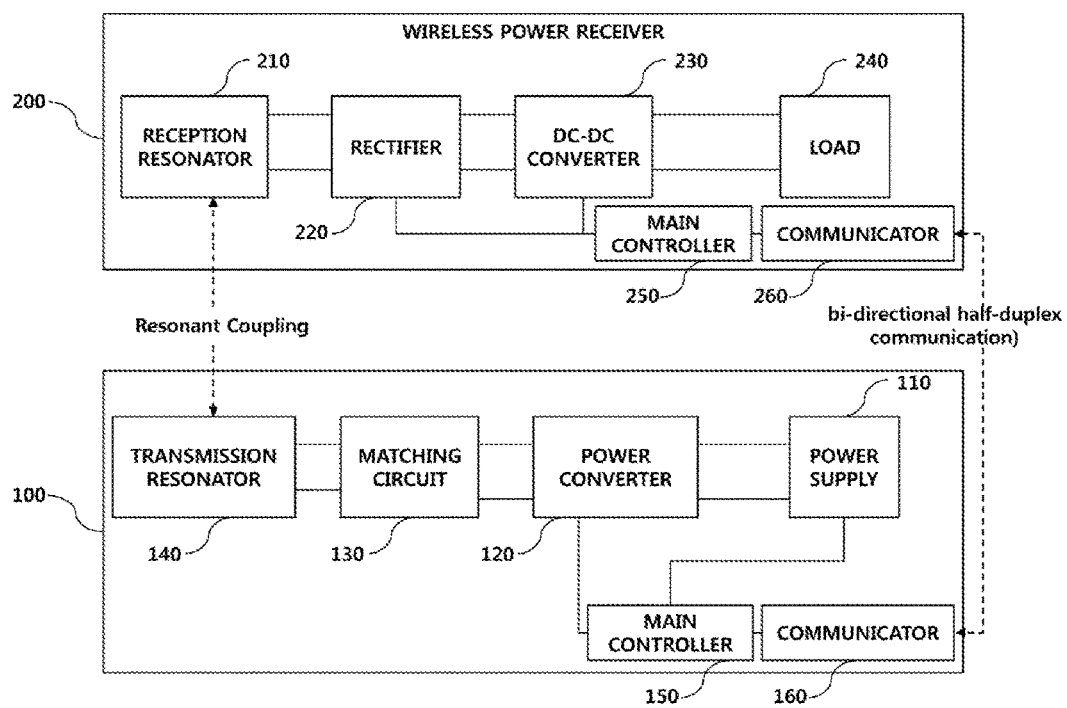
FIG. 1 is a block diagram for explanation of a structure of a wireless power transmission system according to an embodiment of the disclosure.

According to an embodiment of the disclosure, a wireless power management method in a wireless power transmitter for supplying power to at least one user device including a wireless power receiver installed therein may include receiving first to $n^{th}$ state information items corresponding to the at least one user device, respectively, calculating first statistical information based on the first to $n^{th}$ state information items, and transmitting the first statistical information to a server connected via a network.

Reference will now be made in detail to the preferred embodiments of the disclosure, examples of which are illustrated in the accompanying drawings. The suffixes "module" and "unit" of elements herein are used for convenience of description and thus may be used interchangeably and do not have any distinguishable meanings or functions.

Although all elements constituting the embodiments of the disclosure are described as integrated into a single one or to be operated as a single one, the disclosure is not necessarily limited to such embodiments. According to embodiments, all of the elements may be selectively integrated into one or more and be operated as one or more within the object and the scope of the disclosure. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily understood by those skilled in the art to which the disclosure pertains. The computer program may be stored in computer readable media such that the computer program is read and executed by a computer to implement embodiments of the disclosure. Computer program storage media may include magnetic recording media, optical recording media, and carrier wave media.

It will be understood that when an element is referred to as being "on" or "under" and "in front of" or "behind" another element, it may be directly on/under and in front of/behind the element, and one or more intervening elements may also be present.

The term "comprises", "includes", or "has" described herein needs to be interpreted not to exclude other elements but to further include such other elements since the corresponding elements may be included unless mentioned otherwise. All terms including technical or scientific terms have the same meanings as generally understood by a person having ordinary skill in the art to which the disclosure pertains unless mentioned otherwise. Generally used terms, such as terms defined in a dictionary, needs to be interpreted to coincide with meanings of the related art from the context. Unless differently defined in the disclosure, such terms need not to be interpreted in an ideal or excessively formal manner.

It will be understood that, although the terms first, second, A, B, (a), (b), etc. may be used herein to describe various elements of the disclosure, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

In the following description of the embodiments, for convenience of description, an apparatus for wirelessly transmitting power in a wireless power transmission system may be used interchangeably with a wireless power transmitter, a wireless power transmission apparatus, a transmission end, a transmitter, a transmission apparatus, a transmission side, etc.

In addition, for convenience of description, an apparatus for wirelessly receiving power from a wireless power transmission apparatus may be used interchangeably with a wireless power reception apparatus, a wireless power receiver, a reception terminal, a reception side, a reception apparatus, a receiver, etc.

A wireless power transmitter according to an embodiment of the disclosure may be configured in the form of a pad, a cradle, an access point (AP), a small base station, a stand, a ceiling insert type, a wall-hanging type, a vehicle insert type, a vehicle mount type, or the like. One transmitter may simultaneously transmit power to a plurality of wireless power reception apparatuses.

To this end, a wireless power transmitter may include at least one wireless power transmission element.

In addition, according to the disclosure, a wireless power transmitter may be operatively network-associated with another wireless power transmitter and a network. For example, wireless power transmitters may be operatively associated with each other using local area wireless communication such as Bluetooth. As another example, wireless power transmitters may be operatively associated with each other using wireless communication technology such as wideband code division multiple access (WCDMA), long term evolution (LTE)/LTE-advanced, and Wi-Fi.

A wireless power transmission element applied to the disclosure may use various wireless power transmission standards based on an electromagnetic induction method of charging according to the electromagnetic induction principle that a magnetic field is generated from a coil of a power transmission end and electricity is induced from a coil of a reception end under the influence of the magnetic field. Here, the wireless power transmission standards of the electromagnetic induction method may include wireless charging technology of an electromagnetic induction method defined in wireless power consortium (WPC) and/or power matters alliance (PMA).

As another example, a wireless power transmission element may use an electromagnetic resonance method of synchronizing a magnetic field generated by a transmission coil of a wireless power transmitter with a specific resonance frequency and transmitting power to an adjacently located wireless power receiver. For example, the electromagnetic resonance method may include wireless charging technology of a resonance method defined in alliance for wireless power (A4WP) as a wireless charging technology standard organization.

As another example, a wireless power transmission element may use an RF wireless power transmission method of transmitting power to a wireless power receiver positioned a long distance away with a low-energy RF signal.

As another example of the disclosure, a wireless power transmitter according to the disclosure may be designed to support at least two wireless power transmission methods of the aforementioned electromagnetic induction method, electromagnetic resonance method, and RF wireless power transmission method.

In this case, a wireless power transmitter may adaptively determine a wireless power transmission method to be used for a corresponding wireless power receiver based on the type, status, required power, and so on of a wireless power receiver as well as a wireless power transmission method supportable by the wireless power transmitter and the wireless power receiver.

In addition, a wireless power receiver according to an embodiment of the disclosure may include at least one wireless power reception element and may simultaneously and wirelessly receive power from two or more wireless power transmitters. Here, a wireless power reception element may include at least one of the electromagnetic induction method, the electromagnetic resonance method, and the RF wireless power transmission method.

A wireless power receiver according to the disclosure may be mounted on a small-size electronic apparatus such as a mobile phone, a smartphone, a laptop, a digital broadcasting terminal, a personal digital assistants (PDA), a portable multimedia player (PMP), a navigation system, an MP3 player, an electric toothbrush, a radio frequency identification (RFID) tag, an illumination apparatus, a remote controller, and a bobber, without being limited thereto. Accordingly, the wireless power receiver may be any device as long as the wireless power receiver includes the wireless power reception element according to the disclosure to wirelessly receive power or to charge a battery. A wireless power receiver according to another embodiment of the disclosure may also be installed in home appliances including a TV, a refrigerator, a washing machine, etc., a vehicle, an unmanned aerial vehicle, AR. drone, a robot, and so on.

Hereinafter, with reference to FIGS. 1 to 9, a method of managing power using a wireless charging system, and an apparatus and system therefor according to an embodiment of the disclosure will be described with reference to an example in which a wireless charging method is an electromagnetic resonance method.

FIG. 1 is a block diagram for explanation of a structure of a wireless power transmission system according to an embodiment of the disclosure.

Referring to FIG. 1, the wireless power transmission system may include a wireless power transmitter 100 and a wireless power receiver 200.

Although FIG. 1 illustrates the case in which the wireless power transmitter 100 wirelessly transmits power to one wireless power receiver 200, this is merely an embodiment and, thus, according to another embodiment of the disclosure, the wireless power transmitter 100 may wirelessly transmit power to a plurality of wireless power receivers 200. It is noted that, according to another embodiment of the disclosure, the wireless power receiver 200 may wirelessly and simultaneously receive power from a plurality of wireless power transmitters 100.

The wireless power transmitter 100 may generate a magnetic field using a specific power transmission frequency and transmit power to the wireless power receiver 200.

The wireless power receiver 200 may receive power in synchronization with the same frequency as a frequency used by the wireless power transmitter 100. That is, the wireless power receiver 200 may receive power transmitted by the wireless power transmitter 100 according to a resonance phenomenon.

For example, a resonance frequency used for wireless power transmission may be a band of 6.78 MHz, without being limited thereto.

In this case, power transmitted by the wireless power transmitter 100 may be transmitted only to the wireless power receiver 200 that resonates with the wireless power transmitter 100.

A maximum number of wireless power receivers 200 capable of receiving power from one wireless power transmitter 100 may be determined based on a maximum transmission power level of the wireless power transmitter 100, a maximum power reception level of the wireless power receiver 200, and physical structures of the wireless power transmitter 100 and the wireless power receiver 200.

The wireless power transmitter 100 and the wireless power receiver 200 may perform bi-directional communication with a different frequency band from a frequency for wireless power transmission, i.e. a resonance frequency band. For example, the bi-directional communication may use a half-duplex Bluetooth low energy (BLE) communication protocol, without being limited thereto.

The wireless power transmitter 100 and the wireless power receiver 200 may exchange each other's characteristics and state information, i.e. power negotiation information through the bi-directional communication.

For example, the wireless power receiver 200 may transmit predetermined power reception state information for controlling a level of power received from the wireless power transmitter 100 to the wireless power transmitter 100 through bi-directional communication, and the wireless power transmitter 100 may dynamically control a transmitted power level based on the received power reception state information. As such, the wireless power transmitter 100 may optimize power transmission efficiency and may also perform a function of preventing a load from being damaged due to overvoltage, a function of preventing unnecessary power from being wasted due to under voltage, and so on.

The wireless power transmitter 100 may perform a function of authenticating and identifying the wireless power receiver 200 through bi-directional communication, a function of identifying an incompatible apparatus or a non-rechargeable object, a function for identifying a valid load, and so on.

The wireless power transmitter 100 may acquire information on an electronic apparatus installed in the wireless power receiver 200 from the corresponding wireless power receiver 200 through bi-directional communication.

The wireless power transmitter 100 may acquire information on maximum charging capacitance and change in recharging amount of a load connected to the wireless power receiver 200, through bi-directional communication.

In addition, the wireless power transmitter 100 may transmit output power intensity information to the wireless power receiver 200 from a transmission end through bi-directional communication. In this case, the wireless power receiver 200 may measure intensity of power applied to the load during charging and calculate wireless charging efficiency using the output power intensity information of the transmission end and the intensity of power applied to the load. The calculated wireless charging efficiency may be transmitted to the wireless power transmitter 100 through bi-directional communication.

Hereinafter, a wireless power transmission procedure of a resonance method will be described in more detail with reference to FIG. 1.

The wireless power transmitter 100 may include a power supply 110, a power converter 120, a matching circuit 130, a transmission resonator 140, a main controller 150, and a communicator 160. The communicator 160 may include a data transmitter and a data receiver.

The power supply 110 may apply a specific voltage to the power converter 120 under control of the main controller 150. In this case, the applied voltage may be a DC voltage or an AC voltage.

The power converter 120 may convert a voltage received from the power supply 110 into a specific voltage under control of the main controller 150. To this end, the power converter 120 may include at least one of a DC/DC convertor, an AC/DC convertor, and a power amplifier.

The matching circuit 130 may be a circuit for matching impedance between the power converter 120 and the transmission resonator 140 in order to maximize power transmission efficiency.

The transmission resonator 140 may wirelessly transmit power using a specific resonance frequency according to a voltage applied from the matching circuit 130.

The wireless power receiver 200 may include a reception resonator 210, a rectifier 220, a DC-DC converter 230, a load 240, a main controller 250, and a communicator 260. The communicator 260 may include a data transmitter and a data receiver.

The reception resonator 210 may receive power transmitted by the transmission resonator 140 through a resonance phenomenon.

The rectifier 220 may perform a function of converting an AC voltage applied from the reception resonator 210 into a DC voltage.

The DC-DC converter 230 may convert the rectified DC voltage into a specific DC voltage required by the load 240.

The main controller 250 may control operations of the rectifier 220 and the DC-DC converter 230 or may generate the characteristics and state information of the wireless power receiver 200 and may control the communicator 260 to transmit the characteristics and state information of the wireless power receiver 200 to the wireless power transmitter 100. For example, the main controller 250 may monitor output voltages and current intensity of the rectifier 220 and the DC-DC converter 230 and control operations of the rectifier 220 and the DC-DC converter 230.

Information on the monitored output voltages and current intensity may be transmitted to the wireless power transmitter 100 through the communicator 260.

The main controller 250 may compare the rectified DC voltage with a predetermined reference voltage to determine whether a current state is an overvoltage state or an undervoltage state, and upon detecting a system error state as the determination result, the main controller 250 may transmit the detection result to the wireless power transmitter 100 through the communicator 260.

Upon detecting a system error state, the main controller 250 may control operations of the rectifier 220 and the DC-DC converter 230 or control power supplied to the load 240 using a predetermined overcurrent cutoff circuit including a switch and/or a Zener diode in order to prevent a load from being damaged.

In addition, when a predetermined timer driven for handling an external or internal message expires, the main controller 250 may determine a local fault state and transmit a predetermined fault notification message to the wireless power transmitter 100 through the communicator 260.

Although FIG. 1 illustrates the case in which the main controller 150 or 250 and the communicator 160 or 260 of each of the transmitter and the receiver are configured as different modules, this is merely an embodiment and, thus, according to another embodiment of the disclosure, it is noted that the main controller 150 or 250 and the communicator 160 or 260 may be configured as one module.

According to the disclosure, the main controller 250 of the wireless power receiver 200 may calculate estimated time until the corresponding load 240 is completely charged, based on a maximum charging capacitance of the load 240, a current charging state of the load 240, which includes information on the amount of power that has been recharged in the load 240 up to now and/or a ratio of current charging to a maximum charging capacitance. The wireless power receiver 200 may transmit information on estimated time of charging completion, which is calculated by a microprocessor (not shown) of an electronic apparatus, e.g. a smartphone, connected through a predetermined interface. Continuously, the microprocessor may display the estimated time of charging completion on a display element included in the electronic apparatus. Thus far, the case in which the main controller 250 for controlling an operation of the wireless power receiver 200 and the microprocessor included in the electronic apparatus are configured as separate hardware has been exemplified, this is merely an embodiment and, thus, it is noted that the main controller 250 and the microprocessor may be installed in one hardware item to configure a separate software module. In addition, the wireless power receiver 200 may transmit the calculated estimated time of charging completion to wireless power transmitter 100 through bi-directional communication.

In addition, the wireless power receiver 200 according to the disclosure may detect change in an operation state of a connected electronic apparatus and may recalculate estimated time until charging is completed. For example, change in an operation state of a connected electronic apparatus may include at least one of power on/off state change of the electronic apparatus, execution state change of an application in the electronic apparatus, on/off state change of a display of the electronic apparatus, and change in power consumption of the electronic apparatus. That is, the wireless power receiver 200 may adaptively calculate or measure power consumption of the electronic apparatus according to dynamic state change of the electronic apparatus and recalculate the estimated time until charging is completed, based on the calculated or measured power consumption. Needless to say, the recalculated estimated time of charging completion may be transmitted to the wireless power transmitter 100 through bi-directional communication and may be displayed through a display element of the electronic apparatus.

In addition, upon detecting an event of adding a new wireless power receiver to a charging region during charging, an event of releasing connection with a wireless power receiver that is being charged, or an event of completing charging of the wireless power receiver, the wireless power transmitter 100 according to the disclosure may perform a power redistribution procedure for a wireless power receiver as the remaining charging target. In this case, the power redistribution result may be transmitted to wireless power receiver(s) connected through out-of-band communication. The wireless power receiver 200 may recalculate estimated time of charging completion according to the power redistribution result, and the recalculated estimated time of charging completion may be displayed through a display device of the electronic apparatus or may be transmitted to the wireless power transmitter 100 through bi-directional communication.

Thus far, although the case in which the wireless power receiver 200 calculates the estimated time of charging completion has been described, according to another embodiment of the disclosure, the wireless power transmitter 100 may calculate estimated time of charging completion based on information on a maximum charging capacitance of a load, information on a current recharging amount of a load, information on intensity of power applied to the load, etc., which are collected from the wireless power receiver 200. In this case, the estimated time of charging completion may be calculated for each of a wireless power receiver for wirelessly receiving power from the wireless power transmitter 100 or an electronic apparatus, and the wireless power transmitter 100 may display information on the calculated estimated time for charging completion, through an included display element.

As another example, the wireless power transmitter 100 may transmit information on wireless charging efficiency for each device that is being charged, information on estimated time of charging completion, information on power consumption, and so on to another wireless power transmitter connected via a network, a specific home network server, and/or a specific cloud server.

The home network server and/or the cloud server may statistically process and store information received from the wireless power transmitter 100 and may extract and transmit the corresponding statistic information according to request from a user or a user terminal.

Figure 2:
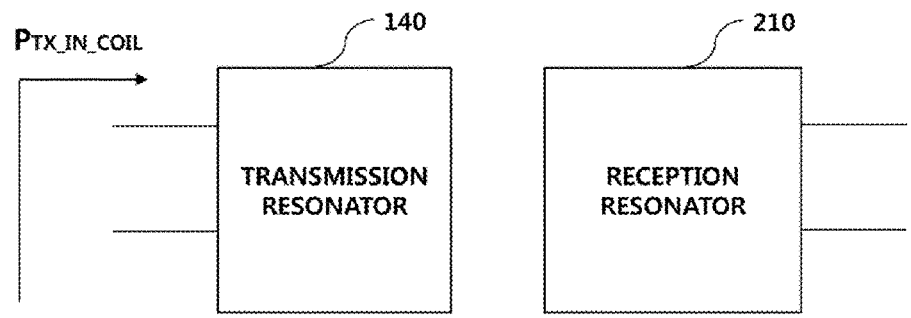
FIG. 2 is a diagram for explanation of the type and characteristics of a wireless power transmitter according to an embodiment of the disclosure.

FIG. 2 is a diagram for explanation of the type and characteristics of a wireless power transmitter according to an embodiment of the disclosure.

Types and characteristics of a wireless power transmitter and a wireless power receiver according to the disclosure may each be classified according to their classes and categories.

The type and characteristics of the wireless power transmitter may be identified through the following three parameters.

First, the wireless power transmitter may be identified by a class determined according to maximum intensity of power applied to the transmission resonator 140.

Here, the class of the wireless power transmitter may be determined by comparing a maximum value of power $P_{TX\_IN\_COIL}$ applied to the transmission resonator 140 with maximum input power $P_{TX\_IN\_MAX}$ that is obviously stated in the following class table (hereinafter, referred to as Table 1) of a wireless power transmitter and is predefined for each class. Here, $P_{TX\_IN\_COIL}$ may be a real number value calculated by dividing a product of voltage (V(t)) and current (I(t)) applied to the transmission resonator 140 per unit time by the corresponding unit time.

TABLE 1

| Class | Maximum input power | Minimum category support requirements | Maximum number of supportable devices |
|---|---|---|---|
| Class 1 | 2 W | 1 x Class 1 | 1 x Class 1 |
| Class 2 | 10 W | 1 x Class 3 | 2 x Class 2 |
| Class 3 | 16 W | 1 x Class 4 | 2 x Class 3 |
| Class 4 | 33 W | 1 x Class 5 | 3 x Class 3 |
| Class 5 | 50 W | 1 x Class 6 | 4 x Class 3 |
| Class 6 | 70 W | 1 x Class 6 | 5 x Class 3 |

Classes shown in Table 1 above are merely an embodiment, and thus a new class may be added or some classes may be removed. In addition, it is noted that values about maximum input power for each class, minimum category support requirements, and a maximum number of supportable devices may also be changed according to the use, shape, and embodied form of a wireless power transmitter.

For example, as shown in Table 1 above, when a maximum value of power $P_{TX\_IN\_COIL}$ applied to the transmission resonator 140 is equal to or greater than a value of $P_{TX\_IN\_MAX}$ corresponding to class 3 and is smaller than a value of $P_{TX\_IN\_MAX}$ corresponding to class 4, a class of a corresponding wireless power transmitter may be determined as class 3.

Second, the wireless power transmitter may be identified according to minimum category support requirements corresponding to an identified class.

Here, the minimum category support requirements may be the number of supportable wireless power receivers corresponding to a highest level category among categories of a wireless power receiver supportable by a corresponding level of wireless power transmitter. That is, the minimum category support requirements may be a minimum number of maximum category devices supportable by the corresponding wireless power transmitter. In this case, the wireless power transmitter may support all categories of wireless power receives corresponding to a maximum category or less according to the minimum category support requirements.

However, when a wireless power transmitter is capable of supporting a wireless power receiver of a higher category than a category obviously stated in the minimum category support requirements, the wireless power transmitter may not be restricted from supporting a corresponding wireless power receiver.

For example, as shown in Table 1 above, a wireless power transmitter of Class 3 needs to support at least one wireless power receiver of category 5. Needless to say, in this case, the wireless power transmitter may support the wireless power receiver 200 corresponding to a lower category level than a category level corresponding to the minimum category support requirements.

In addition, it is noted that, when it is determined that the wireless power transmitter is capable of supporting a higher category level than a category corresponding to the minimum category support requirements, the wireless power transmitter may also support a wireless power receiver of a higher level.

Third, the wireless power transmitter may be identified by a maximum number of supportable devices corresponding to an identified class. Here, the maximum number of supportable devices may be identified by a maximum number of supportable wireless power receivers (hereinafter, referred to as a maximum number of supportable devices) corresponding to a lowest level category among supportable categories in a corresponding class.

For example, as shown in Table 1 above, a wireless power transmitter of class 3 needs to support a maximum of two wireless power receivers of a minimum category 3.

However, when the wireless power transmitter is capable of supporting a maximum number or more of devices corresponding to a class of the wireless power transmitter, a maximum number or more of devices may not be restricted from being supported.

The wireless power transmitter according to the disclosure needs to wirelessly transmit power up to at least the number defined in Table 1 within available power unless there is a special reason that does not permit a power transmission request of the wireless power receiver.

For example, when available power for accepting the corresponding power transmission request does not remain, the wireless power transmitter may not permit the power transmission request of the corresponding wireless power receiver. Alternatively, the wireless power transmitter may control power adjustment of the wireless power receiver.

As another example, when a power transmission request, if accepted, exceeds the number of acceptable wireless power receivers, the wireless power transmitter may not permit the corresponding power transmission request of the wireless power receiver.

As another example, when a category of a wireless power receiver that requests power transmission exceeds a category level supportable at a level of the wireless power receiver, the wireless power transmitter may not permit the corresponding power transmission request of the wireless power receiver.

As another example, when an inner temperature exceeds a reference value or more, a wireless power transmitter may not permit the corresponding power transmission request of the wireless power receiver.

In particular, the wireless power transmitter according to the disclosure may perform a power redistribution procedure based on a currently available power amount. In this case, the power redistribution procedure may be performed in consideration of at least one of a category, a wireless power reception state, a required power amount, priority, and power consumption of a wireless power receiver as a power transmission target, which will be described later.

Here, information on at least one of a category, a wireless power reception state, a required power amount, priority, and power consumption of a wireless power receiver may be transmitted to a wireless power transmitter from a wireless power receiver using at least one control signal through an out-of-band communication channel.

Upon completing the power redistribution procedure, the wireless power transmitter may transmit the power redistribution result to a corresponding wireless power receiver through out-of-band communication.

The wireless power receiver may recalculate estimated time until charging is completed based on the received power redistribution result and transmit the recalculation result to a microprocessor of a connected electronic apparatus. Continuously, the microprocessor may control a display included in an electronic apparatus to display the recalculated estimated time of charging completion. In this case, the display may be controlled to display the estimated time of charging completion for a predetermined time and then to disappear.

According to another embodiment of the disclosure, when the estimated time of charging completion is recalculated, the microprocessor may also control the display to display information on the reason for recalculation. To this end, the wireless power transmitter may also transmit information on the reason for corresponding power redistribution to the wireless power receiver during transmission of the power redistribution result.

According to another embodiment of the disclosure, the wireless power receiver may transmit the recalculated estimated time of charging completion to the wireless power transmitter through bi-directional communication. In this case, the wireless power transmitter may display the received estimated time of charging completion through an installed display element and transmit the estimated time to a home network and/or a cloud server connected via a network.

According to an embodiment of the disclosure, upon detecting internal system error, e.g. overvoltage, under current, overheating, etc., the wireless power transmitter may display the detection result through a display element and transmit the detection result to a home network and/or cloud server connected via a network.

According to an embodiment of the disclosure, upon checking that collected or calculated wireless charging efficiency or wireless power transmission efficiency is equal to or less than a predetermined reference value, the wireless power transmitter may display the checked result through a display element and notify a home network and/or a cloud server connected via a network of the same. A user may access the home network server or a cloud server and identify a wireless power transmitter with low wireless charging efficiency. Here, the wireless power transmitter with low wireless charging efficiency may be determined as a wireless power transmitter positioned in a wireless power shadow area.

According to an embodiment of the disclosure, when a number of times that a power transmission request from a wireless power receiver is rejected is equal to or greater than a reference value due to lack of available power, the wireless power transmitter may notify a home network server and/or cloud server connected via a network of the same. Here, an area in which a wireless power transmitter that rejects a power transmission request a reference number of times or more is installed may be determined as an area in which an additional wireless power transmitter needs to be installed or an existing wireless power transmitter needs to be replaced with a wireless power transmitter with relatively high power transmission capacitance, i.e. a high level. As another example, an area in which a wireless power transmitter that rejects a power transmission request a reference number of times or more is installed may be classified as a danger area in which a wireless power receiver that is not authenticated or not valid or an electronic apparatus with the wireless power receiver installed therein is positioned.

Figure 3:
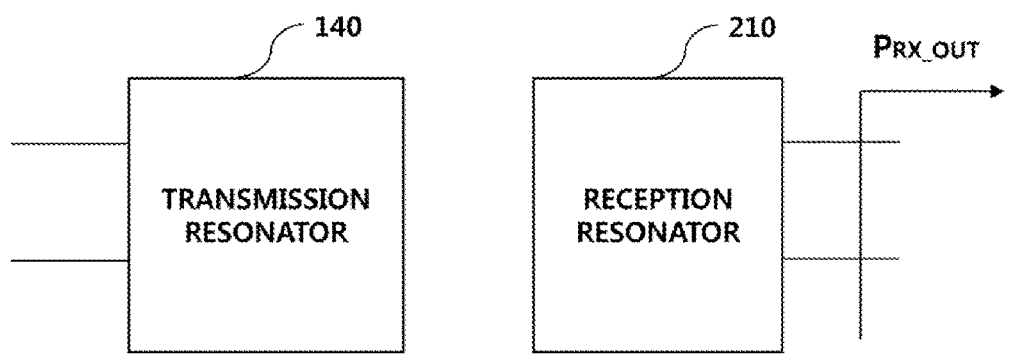
FIG. 3 is a diagram for explanation of the type and characteristics of a wireless power receiver according to an embodiment of the disclosure.

FIG. 3 is a diagram for explanation of the type and characteristics of a wireless power receiver according to an embodiment of the disclosure.

As illustrated in FIG. 3, average output power $P_{RX\_OUT}$ of the reception resonator 210 may be a real number value calculated by dividing a product of voltage (V(t)) and current (I(t)) output by the reception resonator 210 for a unit time by the corresponding unit time. For example, the average output power $P_{RX\_OUT}$ of the reception resonator 210 may be, without being limited to, a real number value calculated by dividing a product of voltage (V(t)) and current (I(t)) measured at a rear end of a rectifier.

As shown in Table 2 below, a category of the wireless power receiver may be defined based on maximum output power $P_{RX\_OUT\_MAX}$ of the reception resonator 210.

TABLE 2

| Category | Maximum input power | Application example |
|---|---|---|
| Category 1 | TBD | Bluetooth handset |
| Category 2 | 3.5 W | Feature phone |
| Category 3 | 6.5 W | Smartphone |
| Category 4 | 13 W | Tablet |
| Category 5 | 25 W | Small laptop |
| Category 6 | 37.5 W | Laptop |
| Category 6 | 50 W | TBD |

For example, when charging efficiency at a load end is 80% or more, a wireless power receiver of Category 3 may supply power of 5 W to a charging port of the load.

Categories shown in Table 2 above may be merely an embodiment and a new category may be added or some classes may be removed. In addition, it is noted that examples of maximum output power for each category and application shown in Table 2 above may also be modified according to the use, shape, and embodied form of a wireless power receiver.

According to an embodiment of the disclosure, an microprocessor of an electronic apparatus that is operatively associated with a wireless power receiver or a wireless power receiver may calculate estimated time until a corresponding load is completely charged based on maximum load capacitance of a load, a current charge of a load, maximum or average input power of a wireless power transmitter, current charging efficiency at a load end of a category of a wireless power receiver, etc. Here, maximum input power corresponding to a category of a wireless power receiver may be adaptively changed according to power redistribution of the wireless power transmitter, and accordingly, the estimated time until charging is completed may be recalculated and changed. In this case, information on the calculated estimated time of charging completion may be transmitted to the wireless power transmitter through a bi-directional communication channel.

According to another embodiment of the disclosure, a wireless power transmitter may receive information on charging efficiency at a load end, a category of a wireless power receiver, maximum charging capacitance of a load, a current charge of the load, etc. from the wireless power receiver through bi-directional communication, and in this case, the wireless power transmitter may calculate the estimated time until a corresponding load is completely charged.

Figure 4:
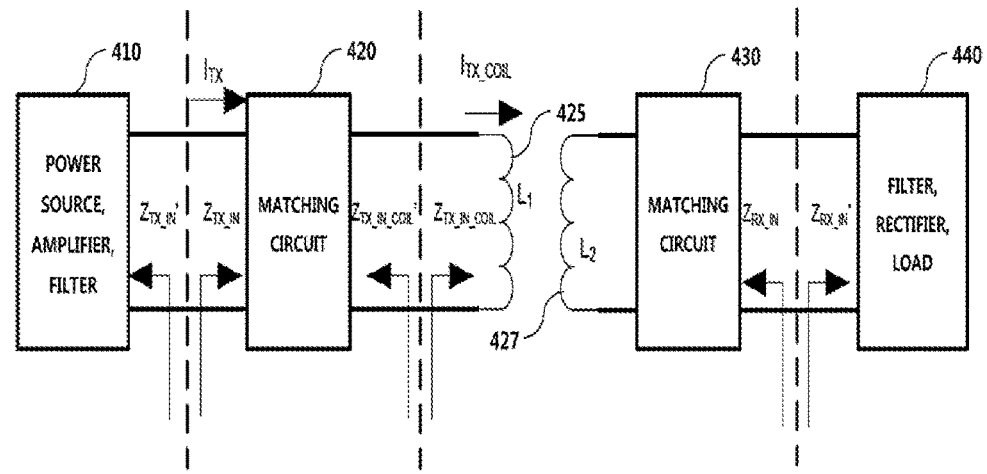
FIG. 4 is an equivalent circuit diagram of a wireless power transmission system according to an embodiment of the disclosure.

FIG. 4 is an equivalent circuit diagram of a wireless power transmission system according to an embodiment of the disclosure.

In detail, FIG. 4 illustrates an interface point in an equivalent circuit for measuring reference parameters to be described below.

Hereinafter, the meaning of reference parameters illustrated in FIG. 4 will be described briefly.

$I_{TX}$ and $I_{TX\_COIL}$ may refer to root mean square (RMS) current supplied to a matching circuit (or matching network) 420 of the wireless power transmitter and RMS current supplied to a transmission resonator coil 425 of the wireless power transmitter, respectively.

$Z_{TX\_IN}$ may refer to input impedance of a rear end of a Power source/Amplifier/filter 410 of the wireless power transmitter and input impedance of a front end of the matching circuit 420.

$Z_{TX\_IN\_COIL}$ may refer to input impedance of a rear end of the matching circuit 420 and a front end of the transmission resonator coil 425.

L1 and L2 may refer to an inductance value of the transmission resonator coil 425 and an inductance value of a reception resonator coil 427, respectively.

$Z_{RX\_IN}$ may refer to input impedance of a rear end of a matching circuit 430 of a wireless power receiver and a front end of a filter/rectifier/load 440 of a wireless power receiver.

According to an embodiment of the disclosure, a resonance frequency used in an operation of a wireless power transmission system may be 6.78 MHz±15 kHz.

In addition, a wireless power transmission system according to an embodiment of the disclosure may provide simultaneous charging, i.e. multi-charging, to a plurality of wireless power receivers, and in this case, even if a new wireless power receiver is added or a wireless power receiver is removed, a reception power variation amount of a maintained wireless power receiver may be controlled not to exceed a predetermined reference value or more. For example, a reception power variation amount may be, without being limited to, ±10%. When it is not possible to control a reception power variation amount not to exceed a reference value or more, the wireless power transmitter may not accept a power transmission request from a newly added wireless power receiver.

According to a condition for maintaining the reception power variation amount, a wireless power receiver that is added to a charging area or is removed may not overlap with an existing wireless power receiver.

When the matching circuit 430 of the wireless power receiver is connected to a rectifier, a real part of $Z_{TX\_IN}$ may have an inverse relationship with load resistance of a rectifier (hereinafter, referred to as $R_{RECT}$). That is, increase in $R_{RECT}$ may reduce $Z_{TX\_IN}$ and reduction in $R_{RECT}$ may increase $Z_{TX\_IN}$.

According to the disclosure, resonator coupling efficiency may be a maximum power reception ratio calculated by dividing power transmitted to a load 440 from a reception resonator coil by power carried in a resonance frequency band by the transmission resonator coil 425. Resonator coupling efficiency between the wireless power transmitter and the wireless power receiver may be calculated when reference port impedance $Z_{TX\_IN}$ of a transmission resonator and a reference port impedance $Z_{RX\_IN}$ of a reception resonator are completely matched with each other.

Table 3 below shows an example of minimum resonator coupling efficiency according to a class of a wireless power transmitter and a class of a wireless power receiver according to an embodiment of the disclosure.

TABLE 3

|  | Category 1 | Category 2 | Category 3 | Category 4 | Category 5 | Category 6 | Category 7 |
|---|---|---|---|---|---|---|---|
| Class 1 | N/A | N/A | N/A | N/A | N/A | N/A | N/A |
| Class 2 | N/A | 74% (−1.3) | 74% (−1.3) | N/A | N/A | N/A | N/A |
| Class 3 | N/A | 74% (−1.3) | 74% (−1.3) | 76% (−1.2) | N/A | N/A | N/A |
| Class 4 | N/A | 50% (−3) | 65% (−1.9) | 73% (−1.4) | 76% (−1.2) | N/A | N/A |
| Class 5 | N/A | 40% (−4) | 60% (−2.2) | 63% (−2) | 73% (−1.4) | 76% (−1.2) | N/A |
| Class 5 | N/A | 30% (−5.2) | 50% (−3) | 54% (−2.7) | 63% (−2) | 73% (−1.4) | 76% (−1.2) |

When a plurality of wireless power receivers is used, minimum resonator coupling efficiency corresponding to class and category shown in Table 3 above may be increased.

According to an embodiment of the disclosure, a microprocessor of an electronic apparatus connected to a wireless power receiver or a wireless power receiver may calculate time until a corresponding load is completely charged, based on at least one of maximum load capacitance of a load, a current charge of a load, charging efficiency of a load, and minimum resonator coupling efficiency corresponding to a category of a wireless power receiver and a class of a wireless power transmitter.

Figure 5:
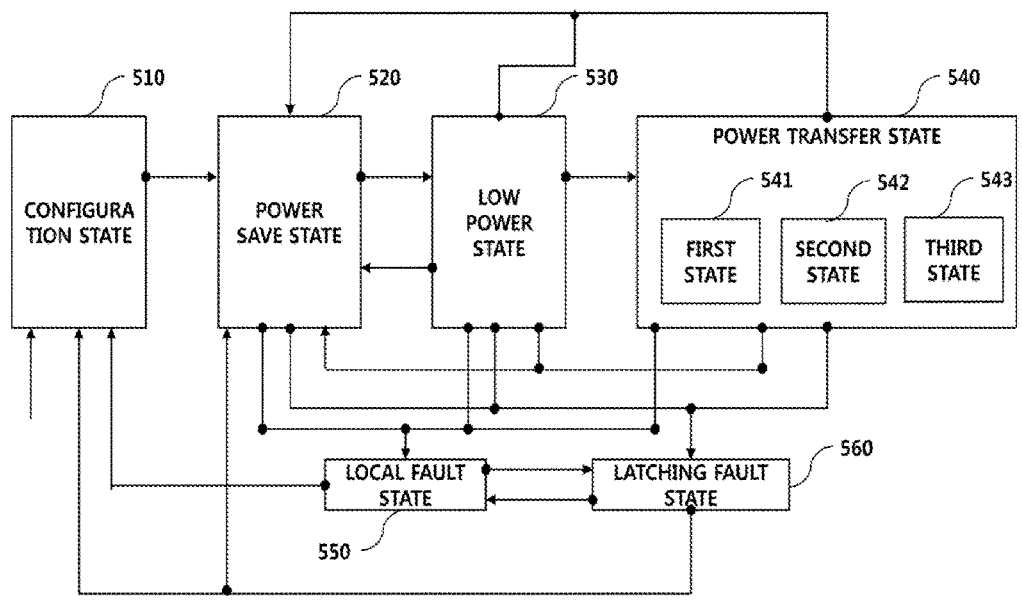
FIG. 5 is a state transition diagram for explanation of a state transition procedure of a wireless power transmitter according to an embodiment of the disclosure.

FIG. 5 is a state transition diagram for explanation of a state transition procedure of a wireless power transmitter according to an embodiment of the disclosure.

Referring to FIG. 5, a state of the wireless power transmitter may roughly include a configuration state 510, a power save state 520, a low power state 530, a power transfer state 540, a local fault state 550, and a latching fault state 560.

When power is supplied to a wireless power transmitter, the wireless power transmitter may transition to the configuration state 510. The wireless power transmitter may transition to the power save state 520 when a predetermined reset timer expires or an initialization procedure is completed in the configuration state 510.

In the power save state 520, the wireless power transmitter may generate a beacon sequence and transmit the beacon sequence through a resonance frequency band.

Here, the wireless power transmitter may perform control to enter the power save state 520 and to initiate the beacon sequence within a predetermined time. For example, the wireless power transmitter may perform control to initialize the beacon sequence within 50 ms after transition to the power save state 520, without being limited thereto.

In the power save state 520, the wireless power transmitter may periodically generate and transmit a first beacon sequence for detection of the wireless power receiver and may detect impedance variation of a reception resonator, i.e. load variation. Hereinafter, for convenience of description, a first beacon and a first beacon sequence will be referred to as a short beacon or a short beacon sequence, respectively.

In particular, the short beacon sequence may be repeatedly generated and transmitted with a predetermined time interval $t_{CYCLE}$ for a short period $t_{SHORT\_BEACON}$ so as to save standby power of the wireless power transmitter before the wireless power receiver is detected. For example, $t_{SHORT\_BEACON}$ may be set to 30 ms or less and $t_{CYCLE}$ may be set to 250 ms+/−5 ms. In addition, current intensity of a short beacon may be a predetermined reference value or more and may be gradually increased for a predetermined time. For example, minimum current intensity of a short beacon may be set to be sufficiently high so as to detect a wireless power receiver of Category 2 or more of Table 2.

According to the disclosure, a wireless power transmitter may include a predetermined sensing element for detection of change in reactance and resistance by a reception resonator according to a short beacon.

In addition, in the power save state 520, the wireless power transmitter may periodically generate and transmit a second beacon sequence for supplying sufficient power required for booting and response of the wireless power receiver. Hereafter, for convenience of description, the second beacon and the second beacon sequence will be referred to as a long beacon and a long beacon sequence, respectively.

That is, when booting is completed through a second beacon sequence, the wireless power receiver may broadcast a predetermined response signal through an out-of-band communication channel.

In particular, the long beacon sequence may be generated and transmitted with a predetermined time interval $t_{LONG\_BEACON\_PERIOD}$ for a relatively long period compared with a short beacon in order to supply sufficient power required for booting of the wireless power receiver. For example, $t_{LONG\_BEACON}$ may be set to 105 ms+5 ms, $t_{LONG\_BEACON\_PERIOD}$ may be set to 850 ms, and current intensity of a long beacon may be relatively high compared with current intensify of the short beacon. In addition, the long beacon may be maintained with power of predetermined intensity during a transmission period.

Then, the wireless power transmitter may be on standby to receive a predetermined response signal during a transmission period of the long beacon after detecting change in impedance of a reception resonator. Hereinafter, for convenience of description, the response signal will be referred to as an advertisement signal. Here, the wireless power receiver may broadcast the advertisement signal through a different out-of-band communication frequency band from a resonance frequency band.

For example, the advertisement signal may include at least one or any one of message identification information for identifying a message defined in a corresponding out-of-band communication standard, unique service or wireless power receiver identification information for identifying whether a wireless power receiver is a proper receiver or a compatible receiver to a corresponding wireless power transmitter, output power information of a wireless power receiver, information on rated voltage/current applied to a load, antenna gain information of a wireless power receiver, information for identifying a category of a wireless power receiver, authentication information of a wireless power receiver, information on whether an overvoltage protection function is installed, and version information of software installed in a wireless power receiver. As another example, the advertisement signal may further include information on maximum charging capacitance of a load, information on a current changed amount of a load, etc.

Upon receiving an advertisement signal, the wireless power transmitter may transition to the low power state 530 from the power save state 520 and may establish an out-of-band communication link with a wireless power receiver.

Continuously, the wireless power transmitter may perform a registration procedure to a wireless power receiver through the established out-of-band communication link. For example, when out-of-band communication is Bluetooth low-power communication, the wireless power transmitter may perform Bluetooth pairing with the wireless power receiver and the transmitter and the receiver exchange at least one of state information, characteristics information, and control information with each other through the paired Bluetooth link.

When the wireless power transmitter transmits a predetermined control signal, i.e. a predetermined control signal for requesting a wireless power receiver to transmit power to a load, for initializing charging through out-of-band communication in the low power state 530 to the wireless power receiver, the wireless power transmitter may transition to the power transfer state 540 from the low power state 530.

When an out-of-band communication link establishment procedure or registration procedure is not normally completed in the low power state 530, the wireless power transmitter may transition to the power save state 520 from the low power state 530.

The wireless power transmitter may drive a separately divided link expiration timer for connection with each wireless power receiver and the wireless power receiver needs to transmit a predetermined message indicating that the receiver is present to the wireless power transmitter with a predetermined time before the link expiration timer expires. The link expiration timer may be reset whenever the message is received and an out-of-band communication link established between the wireless power receiver and the wireless power receiver may be maintained when the link expiration timer does not expire.

When all link expiration timers corresponding to out-of-band communication links established between a wireless power transmitter and at least one wireless power receiver expire in the low power state 530 or the power transfer state 540, the wireless power transmitter may transition to the power save state 520.

Upon receiving a valid advertisement signal from the wireless power receiver, the wireless power transmitter in the low power state 530 may drive a predetermined registration timer. In this case, when a registration timer expires, a wireless power transmitter in the low power state 530 may transition to the power save state 520. In this case, the wireless power transmitter may output a predetermined notification signal indicating registration failure through a notification display element, e.g. including an LED lamp, a display screen, and a beeper, included in the wireless power transmitter.

When all connected wireless power receivers are completely charged in the power transfer state 540, the wireless power transmitter may transition to the low power state 530.

In particular, the wireless power receiver may permit registration of a new wireless power receiver in the remaining states except for the configuration state 510, the local fault state 550, and the latching fault state 560.

In addition, the wireless power transmitter may dynamically control transmitted power based on state information received from the wireless power receiver in the power transfer state 540.

In this case, receiver state information transmitted to the wireless power transmitter from the wireless power receiver may include at least one of required power information, information on voltage and/or current measured at a rear end of a rectifier, charging state information, information for announcing overcurrent, overvoltage, and/or overheating states, and information indicating whether an element for shutting off or reducing power transmitted to a load is activated according to overcurrent or overvoltage. In this case, the receiver state information may be transmitted with a predetermined period or may be transmitted whenever a specific event occurs. In addition, the element for shutting off or reducing power transmitted to a load according overcurrent or overvoltage may be provided using at least one of an ON/OFF switch and a Zener diode. In addition, the charging state information may include at least one of information on a current charge of a load, information indicating whether a load is completely charged, and information on estimated time of charging completion.

According to another embodiment of the disclosure, the receiver state information transmitted to the wireless power transmitter from the wireless power receiver may further include at least one of information indicating that external power is connected to the wireless power receiver by wire and information indicating that an out-of-band communication method is changed, e.g. near field communication (NFC) may be changed to Bluetooth low energy (BLE) communication.

According to another embodiment of the disclosure, a wireless power transmitter may adaptively determine intensity of power to be received for each wireless power receiver or intensity of power to be transmitted for each wireless power receiver based on at least one of current available power of the wireless power transmitter, priority for each wireless power receiver, and the number of connected wireless power receivers. Here, the intensity of power to be transmitted for each wireless power receiver may be determined a ratio for receiving power based on maximum power to be processed by a rectifier of a corresponding wireless power receiver.

Then, the wireless power transmitter may transmit a predetermined power adjustment command containing information on the determined ratio to the corresponding wireless power receiver. In this case, the wireless power receiver may determine whether power is capable of being controlled in the power ratio determined by the wireless power transmitter and may transmit the determination result to the wireless power transmitter through a predetermined power adjustment response message.

According to another embodiment of the disclosure, the wireless power receiver may transmit predetermined receiver state information indicating whether wireless power adjustment is possible according to the power adjustment command of the wireless power transmitter prior to reception of the power adjustment command.

The power transfer state 540 may be any one of a first state 541, a second state 542, and a third state 543 according to a power reception state of a connected wireless power receiver.

For example, the first state 541 may refer to a state in which power reception states of all wireless power receivers connected to the wireless power transmitter are each a normal voltage state.

The second state 542 may refer to a state in which a power reception state of at least one wireless power receiver connected to the wireless power transmitter is a low voltage state and a wireless power receiver of a high voltage state is not present.

The third state 543 may refer to a state in which a power reception state of at least one wireless power receiver connected to the wireless power transmitter is a high voltage state.

Upon detecting system error in the power save state 520, the low power state 530, or the power transfer state 540, the wireless power transmitter may transition to the latching fault state 560.

Upon determining that all connected wireless power receivers are removed from a charging region, the wireless power transmitter in the latching fault state 560 may transition to the configuration state 510 or the power save state 520.

In addition, upon detecting local fault in the latching fault state 560, the wireless power transmitter may transition to the local fault state 550. Here, when local fault is released, the wireless power transmitter in the local fault state 550 may re-transition to the latching fault state 560.

On the other hand, when the wireless power transmitter transitions to the local fault state 550 from any one of the configuration state 510, the power save state 520, the low power state 530, and the power transfer state 540, if local fault is released, the wireless power transmitter may transition to the configuration state 510.

When the wireless power transmitter transitions to the local fault state 550, power supplied to the wireless power transmitter may be shut off. For example, upon detecting fault such as overvoltage, overcurrent, and overheating, the wireless power transmitter may transition to the local fault state 550, without being limited thereto.

For example, upon detecting overvoltage, overcurrent, overheating, or the like, the wireless power transmitter may transmit a predetermined power adjustment command for reducing intensity of power received by the wireless power receiver to at least one connected wireless power receiver.

As another example, upon detecting overvoltage, overcurrent, overheating, or the like, the wireless power transmitter may transmit a predetermined control command for stopping charging of the wireless power receiver to at least one connected wireless power receiver.

Through the aforementioned power adjustment procedure, the wireless power transmitter may prevent a device from being damaged due to overvoltage, overcurrent, overheating, or the like.

Upon detecting overvoltage, overcurrent, overheating, and local fault, e.g. timer expiration for message handling, of a connected wireless power receiver, the wireless power transmitter may transmit the detection result to a home network server connected via a network and/or a cloud server for wireless power management.

In addition, upon detecting overvoltage, overcurrent, overheating, local fault, etc. in the wireless power transmitter, the wireless power transmitter may transmit the detection result to a home network server connected via a network, a cloud server for wireless power management, and/or an adjacent wireless power transmitter.

When intensity of output current of a transmission resonator is a reference value or more, the wireless power transmitter may transition to the latching fault state 560. In this case, the wireless power transmitter having transitioned to the latching fault state 560 may attempt to adjust the intensity of the output current of the transmission resonator to a reference value or less for a predetermined time. Here, the attempt may be repeatedly performed a predetermined number of times. Despite repeated performance, when the latching fault state 560 is not released, the wireless power transmitter may transmit a predetermined notification signal indicating that the latching fault state 560 is not released, to a user using a predetermined notification element. In this case, when all wireless power receivers positioned in the charging region of the wireless power transmitter are removed by the user, the latching fault state 560 may be released.

In addition, when the latching fault state 560 is not released for a predetermined time, the wireless power transmitter may transmit a predetermined notification signal indicating that the latching fault state 560 is not released to a home network server connected via a network, a cloud server for wireless power management, and/or an adjacent wireless power transmitter.

On the other hand, when intensity of output current of a transmission resonator is reduced to a reference value or less within a predetermined time or the intensity of output current of the transmission resonator is reduced to a reference value or less during the predetermined repeated performance, the latching fault state 560 may be automatically released, and in this case, the wireless power transmitter may automatically transition to the power save state 520 from the latching fault state 560 and may re-perform detection and identification procedures on the wireless power receiver.

The wireless power transmitter in the power transfer state 540 may transmit consecutive power and may adaptively control the transmitted power based on state information of the wireless power receiver and a predefined optimal voltage region setting parameter.

For example, the optimal voltage region setting parameter may include at least one of a parameter for identifying a low voltage region, a parameter for identifying an optimal voltage region, a parameter for identifying a high voltage region, and a parameter for identifying an overvoltage region.

When a power reception state of the wireless power receiver is in a low voltage region, the wireless power transmitter may increase transmitted power, and when the power reception state is in a high voltage region, the wireless power transmitter may reduce transmitted power.

The wireless power transmitter may control transmitted power to maximize power transmission efficiency.

The wireless power transmitter may control transmitted power such that a deviation of a power amount required by the wireless power receiver is a reference value or less.

In addition, when an output voltage of a rectifier of a wireless power receiver reaches a predetermined overvoltage region, i.e. when an overvoltage is detected, the wireless power transmitter may stop power transmission.

According to the disclosure, when variation in power received in the power transfer state 540 is stabilized to a reference value or less, the wireless power receiver or an electronic apparatus connected to the wireless power receiver may estimate time until a load is completely charged.

For example, when average intensity of voltage or current measured at a rear end of a rectifier per unit time has a deviation of a reference value or less based on predetermined optimal voltage or current intensity, the wireless power receiver may determine that power reception is stabilized.

As another example, the wireless power transmitter may check whether power adjustment to the corresponding wireless power receiver is stabilized based on state information received from the wireless power receiver. When power adjustment is stabilized, the wireless power transmitter may calculate estimated time of charging completion based on pre-collected maximum charge of a load, a current charge of the load, charging efficiency of the load, etc.

For example, the wireless power transmitter may receive voltage intensity information $V_{RECT}$ measured at a rear end of the rectifier from the wireless power receiver. In this case, when a deviation of a predetermined number of continuously received values of $V_{RECT}$ is maintained within a predetermined number or a deviation of values of $V_{RECT}$ received for a predetermined time is maintained within a reference value, the wireless power transmitter may determine that power adjustment is stabilized.

As another example, when state information is not received from the wireless power receiver for a predetermined time in the power transfer state 540, the wireless power transmitter may determine that power adjustment is stabilized.

Figure 6:
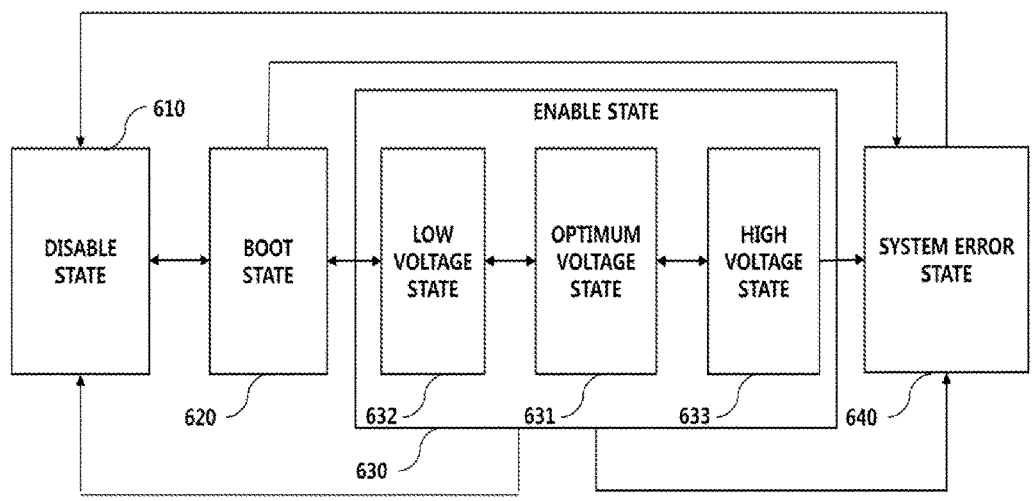
FIG. 6 is a state transition diagram of a wireless power receiver according to an embodiment of the disclosure.

FIG. 6 is a state transition diagram of a wireless power receiver according to an embodiment of the disclosure.

Referring to FIG. 6, a state of the wireless power receiver may largely include a disable state 610, a boot state 620, an enable state 630 (or an on state), and a system error state 640.

In this case, the state of the wireless power receiver may be determined based on intensity (hereinafter, for convenience of description, referred to as $V_{RECT}$) of an output voltage at an end of a rectifier of the wireless power receiver.

The enable state 630 may be divided into an optimum voltage state 631, a low voltage state 632, and a high voltage state 633 according to a value of $V_{RECT}$.

When a measured value of $V_{RECT}$ is equal to or greater than a predetermined value of $V_{RECT\_BOOT}$, the wireless power receiver in the disable state 610 may transition to the boot state 620.

In the boot state 620, the wireless power receiver may establish an out-of-band communication link with the wireless power transmitter and may stand by until a value of $V_{RECT}$ reaches power required at an end of a load.

Upon checking that the value of $V_{RECT}$ reaches power required at the end of the load, the wireless power receiver in the boot state 620 may transition to the enable state 630 and may begin charging.

Upon checking that charging is completed or stopped, the wireless power receiver in the enable state 630 may transition to the boot state 620.

Upon detecting predetermined system error, the wireless power receiver in the enable state 630 may transition to the system error state 640. Here, the system error may include other predefined system error conditions as well as overvoltage, overcurrent, and overheating.

When a value of $V_{RECT}$ is reduced to a value of $V_{RECT\_BOOT}$ or less, the wireless power receiver in the enable state 630 may transition to the disable state 610.

In addition, when a value of $V_{RECT}$ is reduced to a value of $V_{RECT\_BOOT}$ or less, the wireless power receiver in the boot state 620 or the system error state 640 may transition to the disable state 610.

According to the disclosure, variation of power received in the enable state 630 is stabilized to a reference value or less, the wireless power receiver or an electronic apparatus connected to the wireless power receiver may calculate estimated time until a load is completely charged.

For example, when average intensity of a voltage $V_{RECT}$ measured at a rear end of a rectifier for unit time is a reference value or less based on predetermined optimal voltage intensity, the wireless power receiver may determine that power reception is stabilized.

Hereinafter, state transition of the wireless power receiver in the enable state 630 will be described with reference to FIG. 7.

Figure 7:
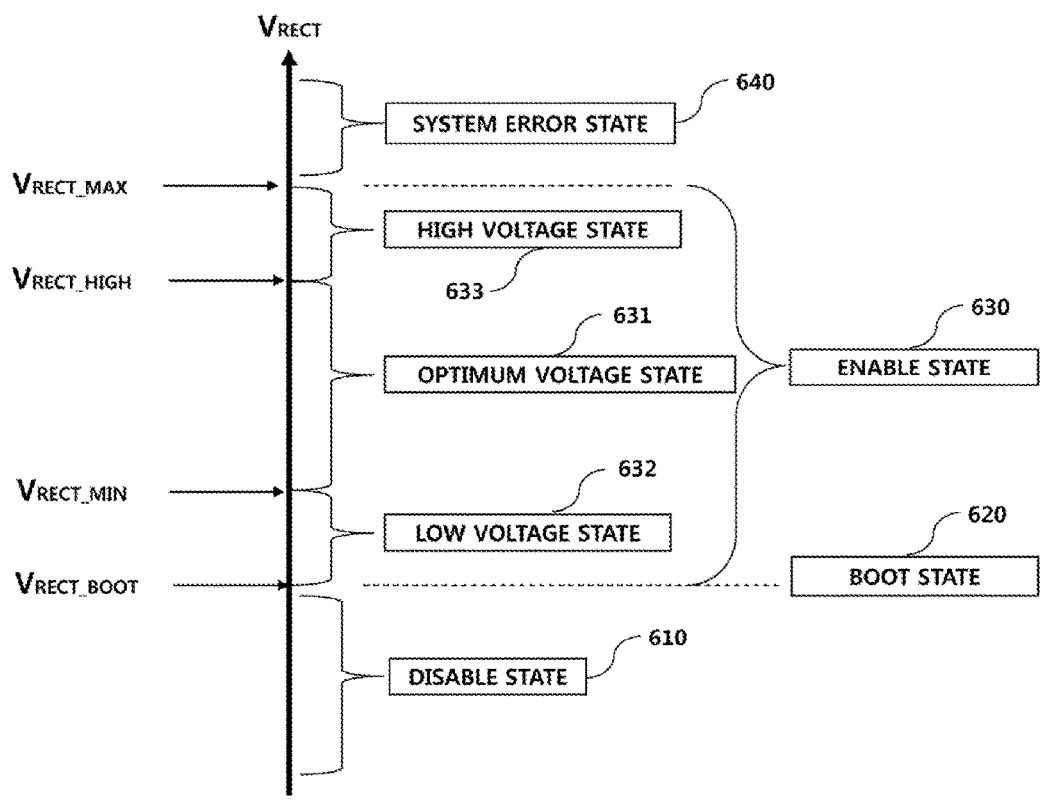
FIG. 7 is a diagram for explanation of an operating region of a wireless power receiver according to $V_{RECT}$ according to an embodiment of the disclosure.

FIG. 7 is a diagram for explanation of an operating region of a wireless power receiver according to $V_{RECT}$ according to an embodiment of the disclosure.

Referring to FIG. 7, when a value of $V_{RECT}$ is less than a predetermined value of $V_{RECT}$ the wireless power receiver may be maintained in the disable state 610.

Then, when a value of $V_{RECT}$ is increased to $V_{RECT\_BOOT}$ or more, the wireless power receiver may transition to the boot state 620 and may broadcast an advertisement signal within a predetermined time. Then, upon detecting the advertisement signal, the wireless power transmitter may transmit a predetermined connection request signal for establishment of an out-of-band communication link to the wireless power receiver.

When the out-of-band communication link is normally established and registration is successful, the wireless power receiver may stand by until a value of $V_{RECT}$ reaches a minimum output voltage (hereinafter, for convenience of description, referred to as $V_{RECT\_MIN}$) at a rectifier for normal charging.

When a value of $V_{RECT}$ exceeds $V_{RECT\_MIN}$, the wireless power receiver may transition to the enable state 630 from the boot state 620 and begin charging of a load.

When a value of $V_{RECT}$ exceeds a predetermined reference value $V_{RECT\_MAX}$ for determination of an overvoltage in the enable state 630, the wireless power receiver may transition to the system error state 640 from the enable state 630.

Referring to FIG. 7, the enable state 630 may be divided into a low voltage state 632, an optimum voltage state 631, and a high voltage state 633 according to a value of $V_{RECT}$.

The low voltage state 632 may refer to a state of $V_{RECT\_BOOT} \leq V_{RECT} \leq V_{RECT\_MIN}$, the optimal voltage state 631 may refer to a state of $V_{RECT\_MIN} < V_{RECT} \leq V_{RECT\_HIGH}$ and the high voltage state 633 may refer to a state of $V_{RECT\_HIGH} < V_{RECT} \leq V_{RECT\_MAX}$.

In particular, the wireless power receiver having transitioned to the high voltage state 633 may postpone an operation for shutting off power supplied to a load for predetermined time (hereinafter, for convenience of description, referred to as high voltage state holding time). In this case, the high voltage state holding time may be predetermined such that the wireless power receiver and the load are not adversely affected in the high voltage state 633.

When the wireless power receiver transitions to the system error state 640, the wireless power receiver may transmit a predetermined message indicating overvoltage generation to the wireless power transmitter through an out-of-band communication link within predetermined time.

In addition, the wireless power receiver may control a voltage applied to a load using an overvoltage interruption element that is installed for preventing a load from being damaged in the system error state 640. Here, the overvoltage interruption element may be an ON/OFF switch and/or a Zener diode.

In the aforementioned embodiment, although a countermeasure method and element for system error in a wireless power receiver when an overvoltage is generated in the wireless power receiver and the wireless power receiver transitions to the system error state 640 has been described this is merely an embodiment and, thus, according to another embodiment of the disclosure, the wireless power receiver may also transition to a system error state due to overheating, overcurrent, etc. in the wireless power receiver.

For example, when the wireless power receiver transitions to a system error state due to overheating, the wireless power receiver may transmit a predetermined message indicating overheating generation to the wireless power transmitter. In this case, the wireless power receiver may drive an included cooling fan or the like so as to reduce internally generated heat.

According to another embodiment of the disclosure, the wireless power receiver may be operatively associated with a plurality of wireless power transmitters so as to wirelessly receive power. In this case, upon determining that a wireless power transmitter that is determined to actually wirelessly receive power is different from a wireless power transmitter with an out-of-band communication link that is actually established, the wireless power receiver may transition to the system error state 640.

According to an embodiment of the disclosure, when intensity of a voltage of $V_{RECT}$ measured at a rear end of a rectifier is maintained in the optimal voltage state 631 for a predetermined time, the wireless power receiver may determine that power reception is stabilized. Upon determining that power reception is stabilized, a wireless power receiver or an electronic apparatus connected to the wireless power receiver may calculate estimated time until a load is completely charged.

Hereinafter, a signaling procedure between a wireless power transmitter and a wireless power receiver according to the disclosure will be described in detail with reference to the following diagrams.

Figure 8:
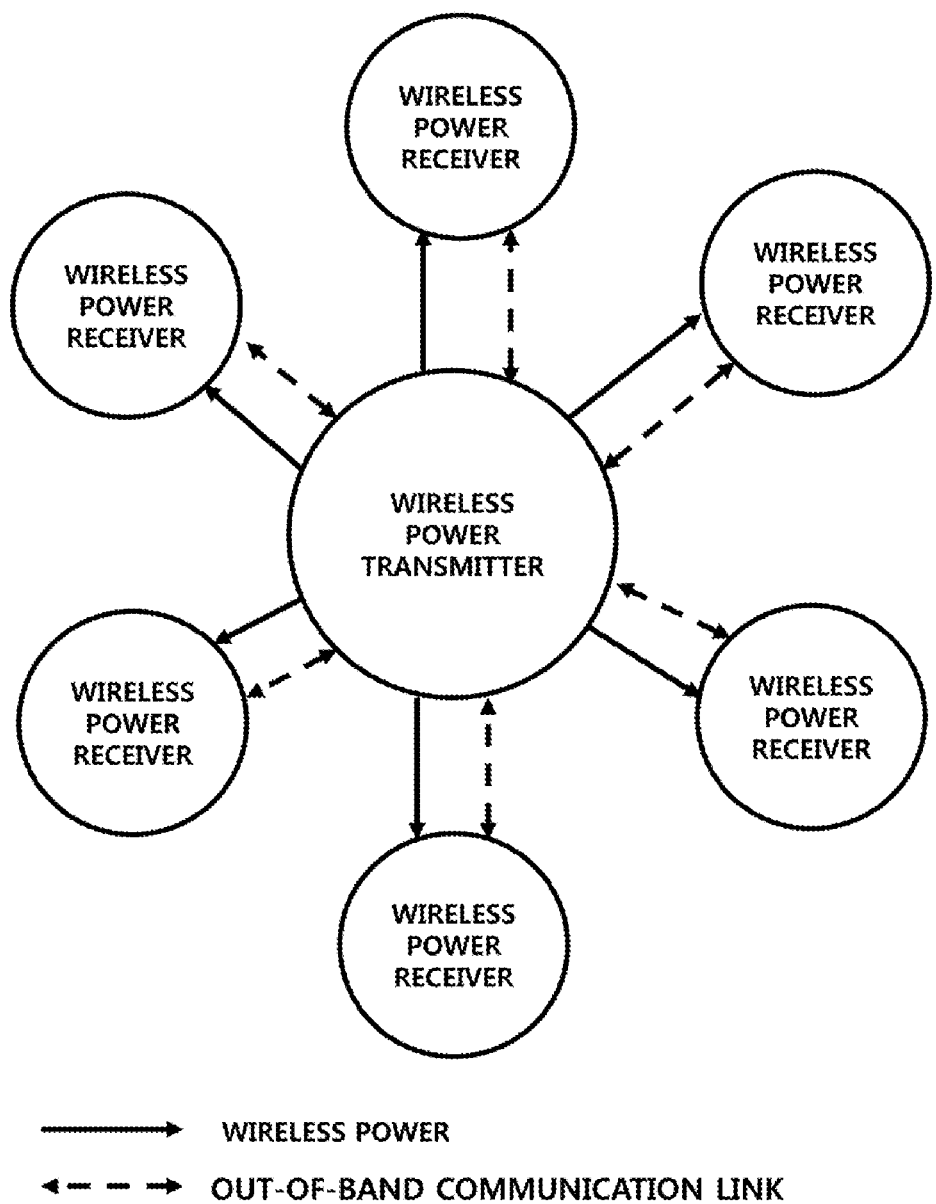
FIG. 8 is a diagram illustrating a configuration of a wireless power transmission system according to an embodiment of the disclosure.

FIG. 8 is a diagram illustrating a configuration of a wireless power transmission system according to an embodiment of the disclosure.

As illustrated in FIG. 8, the wireless power transmission system may be configured with a star topology, without being limited thereto.

The wireless power transmitter may collect information on various characteristics and state information from the wireless power receiver through an out-of-band communication link and control operating and transmission power of the wireless power receiver based on the collected information.

In addition, the wireless power transmitter may transmit characteristics information of the wireless power transmitter and a predetermined control signal to the wireless power receiver through the out-of-band communication link.

The wireless power transmitter may determine a power transmission order for each wireless power receiver of a connected wireless power receiver and may wirelessly transmit power according to the determined power transmission order. For example, the wireless power transmitter may determine the power transmission order based on at least one of a category of the wireless power receiver, a pre-allocated priority for each wireless power receiver, power reception efficiency of the wireless power receiver or power transmission efficiency of the wireless power transmitter, minimum resonator coupling efficiency between the wireless power transmitter and the wireless power receiver, charging efficiency of a load, a charging state of the wireless power receiver, and whether system error occurs for each wireless power receiver.

The wireless power transmitter may determine a power amount to be transmitted for each connected wireless power receiver. For example, the wireless power transmitter may calculate power amount to be transmitted for each wireless power receiver based on a currently available power amount, power reception efficiency for each wireless power receiver, etc. and transmit information on the calculated power amount to the wireless power receiver through a predetermined control message.

Upon detecting change in a wireless charging state, for example, when a new wireless power receiver is added to a charging region, when a wireless power receiver that is already being charged is removed from the charging region, when a wireless power receiver that is already being charged is completely charged, and when system error of a wireless power receiver that is already being charged is detected, the wireless power transmitter may initiate a power redistribution procedure. In this case, the power redistribution result may be transmitted to the wireless power receiver through a predetermined control message.

In addition, the wireless power transmitter may generate a time synchronization signal for acquiring time synchronization with wireless power receiver(s) connected via a network and provide the time synchronization signal. Here, the time synchronization signal may be transmitted through a frequency band, i.e. in-band, for wirelessly transmitting power or a frequency band, i.e. out-of-band, for performing out-of-band communication. The wireless power transmitter and the wireless power receiver may manage communication timing and communication sequence of each other based on the time synchronization signal.

Thus far, although the configuration in which the wireless power transmission system including one wireless power transmitter and a plurality of wireless power receivers is connected via a network via star topology has been described with reference to FIG. 8, this is merely an embodiment and, thus, according to another embodiment of the disclosure, the wireless power transmission system may be configured in such a way that a plurality of wireless power transmitters and a plurality of wireless power receivers are connected via a network to wirelessly transmit and receive power. In this case, the wireless power transmitter may transmit state information of the wireless power transmitter and/or state information of a wireless power receiver connected to the wireless power transmitter to another wireless power transmitter connected via a network through a separate communication channel. In addition, when the wireless power receiver is a movable device, the wireless power receiver may be controlled to receive seamless power by the wireless power receiver that is being moved through handover with the wireless power transmitter.

When one wireless power receiver simultaneously and wirelessly receives power from a plurality of wireless power transmitters during a handover procedure, the wireless power receiver may sum power received from each wireless power transmitter and calculate estimated time until a load is completely charged based on the summed power. That is, the wireless power receiver or an electronic apparatus connected to the wireless power receiver may adaptively calculate estimated time of charging completion according to handover and may control a display screen to display the estimated time.

The wireless power transmitter may be operated as a network coordinator and may exchange information with the wireless power receiver through an out-of-band communication link. For example, the wireless power transmitter may receive various information items of the wireless power receiver to generate and manage a predetermined device control table and transmit network management information to the corresponding wireless power receiver based on the device control table. As such, the wireless power transmitter may generate a network of the wireless power transmission system and maintain the network.

Figure 9:
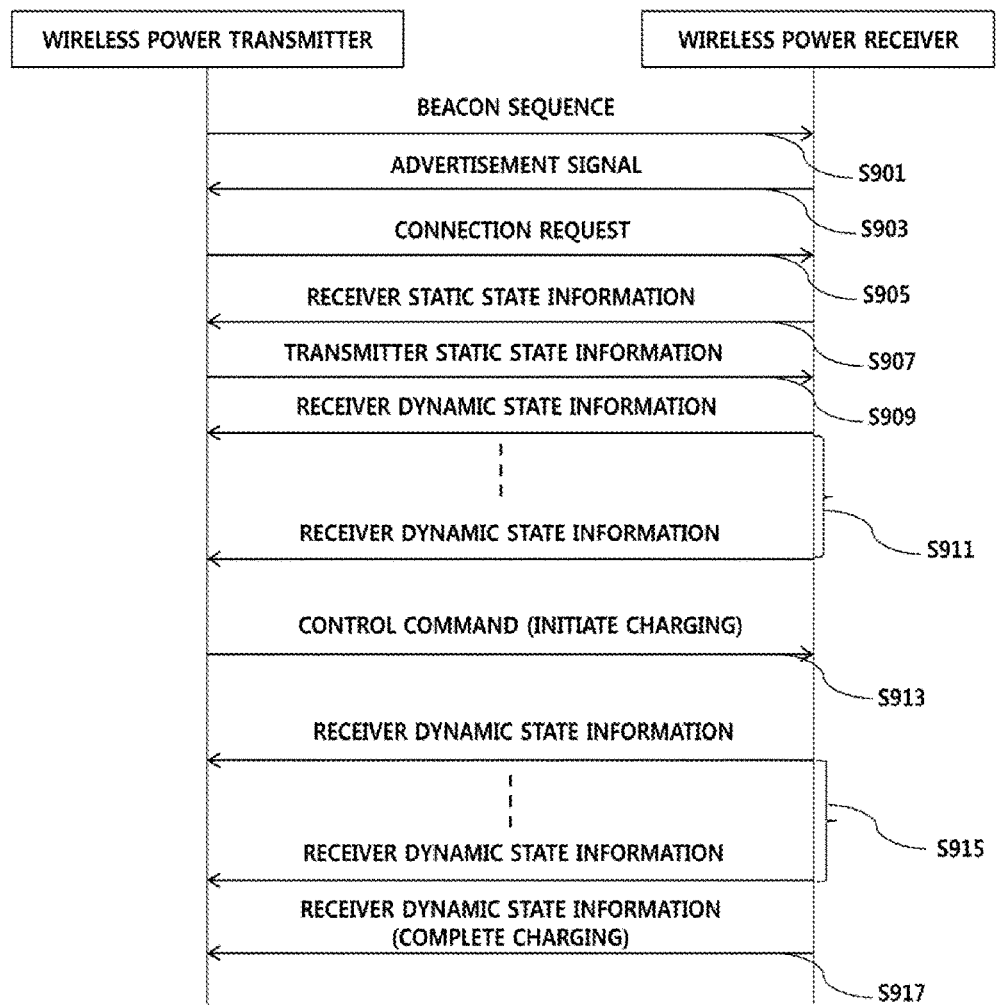
FIG. 9 is a flowchart for explanation of a wireless charging procedure according to an embodiment of the disclosure.

FIG. 9 is a flowchart for explanation of a wireless charging procedure according to an embodiment of the disclosure.

Referring to FIG. 9, when configuration of the wireless power transmitter, i.e., booting is completed according to power supply, the wireless power transmitter may generate a beacon sequence and transmit the beacon sequence through a transmission resonator (S901).

Upon detecting the beacon sequence, the wireless power receiver may broadcast an advertisement signal containing identification information and characteristics information of the wireless power receiver (S903). In this case, it is noted that the advertisement signal may be repeatedly transmitted with a predetermined period until a connection request signal to be described later is received from the wireless power transmitter.

Upon receiving an advertisement signal, the wireless power transmitter may transmit a predetermined connection request signal for establishment of an out-of-band communication link to the wireless power receiver (S905).

Upon receiving the connection request signal, the wireless power receiver may establish the out-of-band communication link and transmit static state information of the wireless power receiver through the established out-of-band communication link (S907).

Here, the static state information of the wireless power receiver may include at least one of category information, hardware and software version information, maximum rectifier output power information, initial reference parameter information for power adjustment, information on required voltage or power, information for identifying whether a power adjustment function is installed, information on a supportable out-of-band communication method, information on a supportable power control algorithm, and information on an initially set voltage value of an end of a preferred rectifier in a wireless power receiver. In addition, the static state information of the wireless power receiver may further include maximum capacity information of a load, information on a current charge of a load, etc.

Upon receiving the static state information of the wireless power receiver, the wireless power transmitter may transmit the static state information of the wireless power transmitter to the wireless power receiver through the out-of-band communication link (S909).

Here, the static state information of the wireless power transmitter may include at least one of transmitter output power information, class information, hardware and software version information, information on a maximum number of supportable wireless power receivers, and/or a number of currently connected wireless power receivers.

Then, the wireless power receiver may monitor power reception state and charging state of the wireless power receiver in real time and may transmit dynamic state information to the wireless power transmitter periodically or when a specific event occurs (S911).

Here, the dynamic state information of the wireless power receiver may include at least one of information on output voltage and current of a rectifier, information on voltage and current applied to a load, information on an internally measured temperature of the wireless power receiver, reference parameter variation information (a a minimum rectifying voltage value, a maximum rectifying voltage value, and initially set variation value in voltage at an end of a preferred rectifier) for power adjustment, charging state information, e.g. information on whether charging is completed and information on a current charge of the load, system error information, and alert information, e.g. the local fault information. The wireless power transmitter may change a setting value contained in existing static state information upon receiving the reference parameter variation information for power adjustment and perform power adjustment.

Upon preparing a sufficient amount of power for charging the wireless power receiver, the wireless power transmitter may transmit a predetermined control command through an out-of-band communication link and control the wireless power receiver to initiate charging (S913).

Then, the wireless power transmitter may receive dynamic state information from the wireless power receiver and may dynamically control transmitted power (S915).

When internal system error is detected or charging is completed, the wireless power receiver may add data for identifying corresponding system error and/or data indicating that charging is completed to the dynamic state information and transmit the information to the wireless power transmitter (S917). Here, the system error may include overcurrent, overvoltage, overheating, etc.

According to another embodiment of the disclosure, when currently available power does not satisfy required power of all wireless power receivers, the wireless power transmitter may redistribute power to be transmitted to each wireless power receiver and transmit the redistributed power to the corresponding wireless power receiver through a predetermined control command.

In addition, when a new wireless power receiver is additionally registered or connected during wireless charging, the wireless power transmitter may redistribute power to be received for each connected wireless power receiver based on the currently available power and transmit the redistributed power to the corresponding wireless power receiver through a predetermined control command.

When an existing connected wireless power receiver is completely charged or an out-of-band communication link is released, e.g. the case in which the wireless power receiver is removed from a charging region, during wireless charging, the wireless power transmitter may redistribute power to be received for each maintained wireless power receiver and transmit the redistributed power to the corresponding wireless power receiver through a predetermined control command.

In addition, the wireless power transmitter may check whether the wireless power receiver has a power adjustment function installed therein through a predetermined control procedure. In this case, when a power redistribution situation occurs, the wireless power transmitter may redistribute power with respect to only a wireless power receiver having a power adjustment function installed therein.

For example, the power redistribution situation may occur when an event occurs, for example, when a valid advertisement signal is received from a non-connected wireless power receiver and a new wireless power receiver is added or a dynamic parameter indicating a current state of a connected wireless power receiver is received, when a pre-connected wireless power receiver is determined not to exist any longer, when a pre-connected wireless power receiver is completely charged, or when an alert message indicating a system error state of a pre-connected wireless power receiver is received.

Here, the system error state may include an overvoltage state, an overcurrent state, an overheating state, a network connection error state, etc.

For example, the wireless power transmitter may transmit power redistribution related information to the wireless power receiver through a predetermined control command.

Here, the power redistribution related information may include command information for power adjustment of the wireless power receiver, information for identifying whether a power transmission request is permitted or denied, time information for generating valid load variation by the wireless power receiver, etc.

Here, the command for power adjustment of the wireless power receiver may include a first command for controlling the wireless power receiver to provide received power to a load, a second command for permission of indicating that the wireless power receiver is being charged, a power adjustment command indicating a ratio of maximum power to be provided by the wireless power transmitter compared with maximum rectifier power of the wireless power receiver, etc.

When the wireless power receiver does not support the power adjustment command, the wireless power transmitter may not transmit the power adjustment command to the corresponding wireless power receiver.

For example, when a new wireless power receiver is registered, the wireless power transmitter may determine whether a power amount required by the wireless power receiver is capable of being provided based on an available power amount of the wireless power transmitter. As the determination result, when the required power amount exceeds an available power amount, the wireless power transmitter may check whether a power adjustment function is installed in the corresponding wireless power receiver. As the checked result, when the power adjustment function is installed, the wireless power receiver may determine the amount of power to be received by the wireless power receiver within an available power amount and transmit the determination result to the wireless power receiver through a predetermined control command.

Needless to say, power redistribution may be performed within a range in which the wireless power transmitter and the wireless power receiver are capable of being normally operated and/or capable of being normally charged.

In addition, the information for identifying whether the power transmission request is permitted or denied may include a permission condition and a denial reason.

For example, the permission condition may include permission under a condition of standby for a predetermined time due to insufficient available power. The denial reason may include denial due to insufficient available power, denial due excess of the number of acceptable wireless power receivers, denial due to overheating of the wireless power transmitter, denial due to a limited class of the wireless power transmitter, etc.

According to an embodiment of the disclosure, the wireless power transmitter may collect detailed information on permission and denial according to the power transmission request and transmit the collected detailed permission and denial information to a home network server connected via a network and/or a cloud server. Here, the collected detailed permission and denial information may include at least one of a total number of times that a power transmission request is received, a total number of permission times, a total number of denial times, a number of instantaneous permission times, a number of standby permission times, a number of denial times due to insufficient power, a number of denial times due to excess of the number of wireless power receivers, a number of denial times due to wireless power transmitter system error, a number of denial times due to authentication failure, and a number of denial times due to a limited class.

A home network server and/or a cloud server for power management may statistically process the collected detailed permission and denial information for each wireless power transmitter and may automatically transmit the processed statistical information to a predetermined user terminal or the like or transmit the statistical information to a corresponding user terminal according to a user search request. The user may determine whether the wireless power transmitter is enlarged/modified/removed through the received statistical information.

As another example, a home network server and/or a cloud server for power management may determine whether the wireless power transmitter is enlarged/modified/removed based on the collected detailed permission and denial information for each wireless power transmitter and transmit the determination result to a predetermined user terminal.

A wireless power receiver according to another embodiment of the disclosure may support a plurality of out-of-band communication methods. In order to change a currently established out-of-band communication link to a different manner, the wireless power receiver may transmit a predetermined control signal for requesting change in out-of-band communication to the wireless power transmitter. Upon receiving the request signal for change in out-of-band communication, the wireless power transmitter may release a currently established out-of-band communication link and establish a new out-of-band communication link using the out-of-band communication method requested by the wireless power receiver.

For example, an out-of-band communication method applicable to embodiments of the disclosure may include at least one of near field communication (NFC), radio frequency identification (RFID) communication, Bluetooth low energy (BLE) communication, wideband code division multiple access (WCDMA) communication, long term evolution (LTE)/LTE-advance communication, and Wi-Fi communication.

In addition, communication between a wireless power transmitter applicable to embodiments of the disclosure and a home network server and/or a cloud server for power management, communication between a user terminal and a home network server and/or a cloud server for power management, and communication between wireless power transmitters may be performed via any one or at least one combination of a wired or wireless IP network, wideband code division multiple access (WCDMA) communication, long term evolution (LTE)/LTE-advance communication, and Wi-Fi communication, without being limited thereto.

Figure 10:
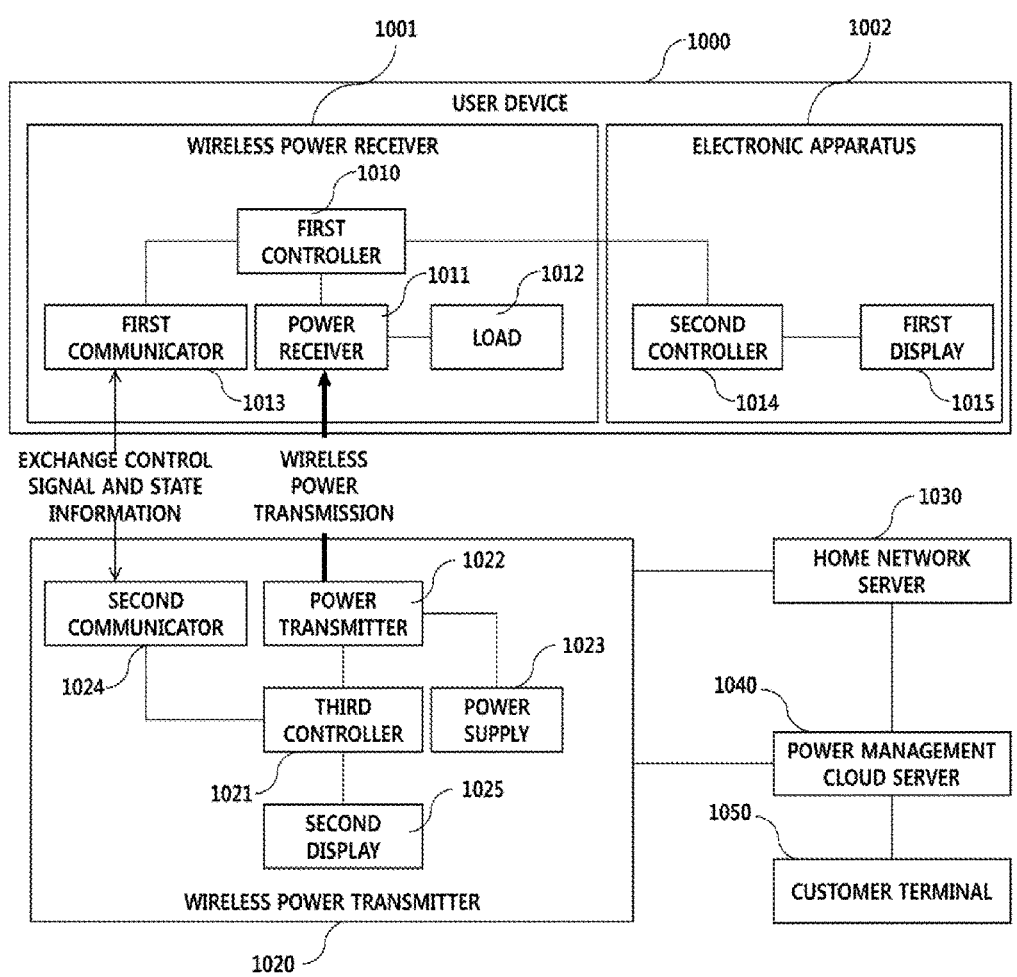
FIG. 10 is a diagram illustrating a structure of a wireless power management system for explanation of a wireless power managing method according to an embodiment of the disclosure.

FIG. 10 is a diagram illustrating a structure of a wireless power management system for explanation of a wireless power managing method according to an embodiment of the disclosure.

Referring to FIG. 10, the wireless power management system may largely include a user device 1000, a wireless power transmitter 1020, a home network server 1030, a power management cloud server 1040, and a customer terminal 1050. However, components of the wireless power management system illustrated in FIG. 10 are not a requirement and, thus, greater or fewer components may alternatively be implemented. In addition, the home network server 1030 may be configured as the same device as that of the power management cloud server 1040 so as to perform their functions in one device.

In addition, although FIG. 10 illustrates the case in which the wireless power management system includes only one wireless power transmitter 1020 and one user device 1000, this is only for convenience of description, and thus it is obvious based on the above description of FIGS. 1 to 9 that the wireless power management system may include greater wireless power transmitters and user devices.

The user device 1000 may wirelessly receive power transmitted by the wireless power transmitter 1020 through at least one of a magnetic induction method, an electromagnetic resonance method, and an RF method. In addition, the user device 1000 may exchange state information with the wireless power transmitter 1020 through in-band communication and/or bi-directional out-of-band communication. Here, a description of the exchanged state information is substituted with the above description of FIGS. 1 to 9.

The user device 1000 may include a wireless power receiver 1001 including a first controller 1010, a power receiver 1011, a load 1012, and a first communicator 1013, and an electronic apparatus 1002 including a second controller 1014 and a first display 1015.

For example, the wireless power receiver 1001 may be embedded in the electronic apparatus 1002 but this is merely an embodiment and, thus, the wireless power receiver 1001 according to another embodiment of the disclosure may be separately implemented and may be detachably installed in the electronic apparatus 1002.

When the user device 1000 is a mobile terminal such as a smartphone, the electronic apparatus 1002 of the user device 1000 may include a wireless communication module and a GPS reception module. For example, the wireless communication module may include at least one of a WiFi communication module, a 3G mobile communication module such as wideband codedivision multiple access (WCDMA) or CDMA2000, a 3.5G mobile communication module such as high speed packet access (HSPA), and a 4G/4.5G mobile communication module such as long term evolution (LTE)/LTE_advanced.

In particular, the user device 1000 may communicate with a power management cloud server 1040 through an included wireless communication module. For example, the user device 1000 may provide current position information acquired through a GPS reception module to the power management cloud server 1040. The power management cloud server 1040 may search for an area (or a place) in which wireless charging is capable of being performed so as to correspond to a current position of the corresponding user device 1000 and transmit the search result to the user device 1000 through a wireless communication network.

The power management cloud server 1040 according to an embodiment of the disclosure may perform a wireless charging service subscription procedure with the user device 1000 including the wireless power receiver 1001 installed therein through a wireless communication network or monitor a state of the user device 1000. Here, the monitored state information of the user device 1000 may include at least one of battery state information, application use state information, and current position information, without being limited thereto, and thus, the monitored state information may be any information as long as the information is capable of being collected by the user device 1000.

The power management cloud server 1040 according to an embodiment of the disclosure may perform update through a wireless communication network when there is software or firmware to be updated with respect to a specific device.

According to an embodiment of the disclosure, a user may access the power management cloud server 1040 through a predetermined application installed in the user device 1000 so as to purchase a charging coupon corresponding to the wireless power receiver 1001 or electronic apparatus 1002 included in the user device 1000. Here, the power management cloud server 1040 and the wireless power transmitter 1020 may identify at least one of information on rechargeable time, information on a rechargeable power amount, information on rechargeable area and/or place, information on charging priority, and information on a power reception class of the corresponding wireless power receiver 1001 through the charging coupon. To this end, the wireless power transmitter 1020 may transmit predetermined device identification information on the identified wireless power receiver 1001 to the power management cloud server 1040 and acquire information on a charging coupon corresponding to the corresponding device identification information from the power management cloud server 1040. In this case, the power management cloud server 1040 may maintain information on the charging coupon corresponding to the device identification information in an internal database.

In addition, the power management cloud server 1040 may enable or disable the wireless power transmitter through a predetermined control command.

For example, the power management cloud server 1040 may acquire position information of the user device 1000. In this case, the power management cloud server 1040 may identify a wireless power transmitter to be enabled and a wireless power transmitter to be disabled based on the acquired position information of the user device 1000 and pre-known position information of the wireless power transmitter and may ON/OFF-control a wireless power transmitter connected via a network according to the identification result.

When a plurality of wireless power receivers are connected to a specific wireless power transmitter, the power management cloud server 1040 may perform control to enable or disable charging to the specific wireless power receiver. For example, the power management cloud server 1040 may dynamically determine a charging target receiver in the corresponding wireless power transmitter based on receiver state information and/or receiver state information received from the wireless power transmitter.

In addition, the power management cloud server 1040 according to an embodiment of the disclosure may receive a predetermined charging completion message indicating that charging is completed from the user device 1000 through a wireless communication network. In this case, the power management cloud server 1040 may control the corresponding wireless power transmitter to stop transmitting power to the wireless power receiver that is completely charged. As such, a processed load of the wireless power transmitter may be minimized.

The wireless power transmitter 1020 may include a third controller 1021, a power transmitter 1022, a power supply 1023, a second communicator 1024, and a second display 1025.

However, components of the user device 1000 and the wireless power transmitter 1020 illustrated in FIG. 10 are not a requirement and, thus, it is noted that greater or fewer components may alternatively be implemented.

The wireless power transmitter 1020 may wirelessly transmit power supplied from the power supply 1023 through the power transmitter 1022.

The user device 1000 may wirelessly receive power through the power receiver 1011 and may transmit the received power to the load 1012 so as to perform charging.

According to the disclosure, the power transmitter 1022 and the power receiver 1011 may support at least one wireless power transmission method among an electromagnetic resonance method, a magnetic induction method, and an RF method.

The wireless power receiver 1001 and the wireless power transmitter 1020 may exchange information with each other through the first communicator 1013 and the second communicator 1024, respectively.

Here, the exchanged information may include at least one of the control signal and state information items that have been described with reference to FIGS. 1 to 9 and, thus, a description of the exchanged state information is substituted with the above description.

The first communicator 1013 and the second communicator 1024 may perform communication using at least one of in-band communication using the same frequency band as a frequency band used in wireless power transmission and out-of-band command using a different frequency band from a frequency band used in wireless power transmission.

The third controller 1021 of the wireless power transmitter 1020 may calculate power consumption for each user device 1000 and/or each time zone, charging efficiency for each user device 1000, estimated time of charging completion for each user device 1000, total power consumption and total charging efficiency corresponding to the wireless power transmitter 1020, statistics of permission and denial according to a power transmission request corresponding to the wireless power transmitter 1020, etc. based on state information and control signals received from the wireless power receiver 1001 and perform control to output the calculation result through the second display 1025.

The wireless power transmitter 1020 may further include an input element (not shown) such as a touch panel and a key button and a user may search for the calculation result through the input element.

In addition, the wireless power transmitter 1020 may transmit the calculation result to the home network server 1030 and/or the power management cloud server 1040.

The home network server 1030 and/or the power management cloud server 1040 may statistically process and store information that is collected and/or calculated for each wireless power transmitter/user device based on the calculation result received from the wireless power transmitter 1020 and may sum all amounts of power consumption of all wireless power transmitters connected to the home network server 1030 to calculate estimated electric charges. A user may access the home network server 1030 and/or the power management cloud server 1040 through the customer terminal 1050 and may search for the statistically processed information and the estimated electric charges.

In addition, the home network server 1030 and/or the power management cloud server 1040 may control maximum transmission power of the wireless power transmitter 1020 based on the calculation result received from the wireless power transmitter 1020. For example, when a number of times that a power transmission request is denied due to insufficient available power per unit time exceeds a reference value, the home network server 1030 and/or the power management cloud server 1040 may increase maximum output power of the corresponding wireless power transmitter. As another example, when a number of times that a power transmission request is denied for the reason such as overheating, overvoltage, and overcurrent per unit time, the home network server 1030 and/or the power management cloud server 1040 may reduce maximum output power of the corresponding wireless power transmitter. As another example, the home network server 1030 and/or the power management cloud server 1040 may reduce maximum output power with respect to a wireless power transmitter with wireless charging efficiency of a first reference value or less and increase maximum output power with respect to a wireless power transmitter of a second reference value or less. Here, the first reference value and the second reference value may be the same or different.

The home network server 1030 and/or the power management cloud server 1040 may determine a wireless power supply shadow area based on the statistically processed information and may provide a predetermined user interface so as to transmit the determined wireless power supply shadow area to a predetermined customer terminal 1050 or to search for the determined wireless power supply shadow area by the corresponding customer terminal 1050. Needless to say, the home network server 1030 and/or the power management cloud server 1040 may transmit the statistically processed information and information on the estimated electric charges to a predetermined customer terminal 1050 periodically or when a specific event occurs—e.g., when the estimated electric charges are a predetermined price or more.

Upon checking the user device 1000 that is completely charged, the home network server 1030 and/or the power management cloud server 1040 may transmit a predetermined notification message indicating that the corresponding user device is completely charged to the corresponding customer terminal 1050. In this case, the home network server 1030 and/or the power management cloud server 1040 may receive a predetermined notification message indicating the corresponding user device is completely charged from the wireless power transmitter but this is merely an embodiment and, thus, according to another embodiment of the disclosure, the home network server 1030 and/or the power management cloud server 1040 may receive a predetermined notification message indicating charging completion directly from the user device 1000 through a wireless communication network.

In addition, the home network server 1030 and/or the power management cloud server 1040 may map and display the wireless power supply shadow area to a map corresponding to a corresponding area and then provide the result to the corresponding customer terminal 1050.

For example, when the wireless power transmitter is installed in a factory, the home network server 1030 and/or the power management cloud server 1040 may display at least one of a position and a wireless power supply shadow area of the wireless power transmitter on a factory layout map and provide the result to a predetermined manager terminal and/or a user terminal of the corresponding factory.

As another example, when the wireless power transmitter is installed in home, the home network server 1030 and/or the power management cloud server 1040 may display at least one of a position and wireless power supply shadow area of the wireless power transmitter in a plane view of a corresponding home and provide the displayed information to a predetermined customer terminal or user device.

According to another embodiment of the disclosure, the information that is calculated and statistically processed by the home network server 1030 may be transmitted to the power management cloud server 1040.

The customer terminal 1050 applied to embodiments of the disclosure may include a mobile phone, a smartphone, a laptop, a desktop computer, a digital broadcast terminal, personal digital assistants (PDA), a portable multimedia player (PMP), a navigation device, and so on.

Figure 11:
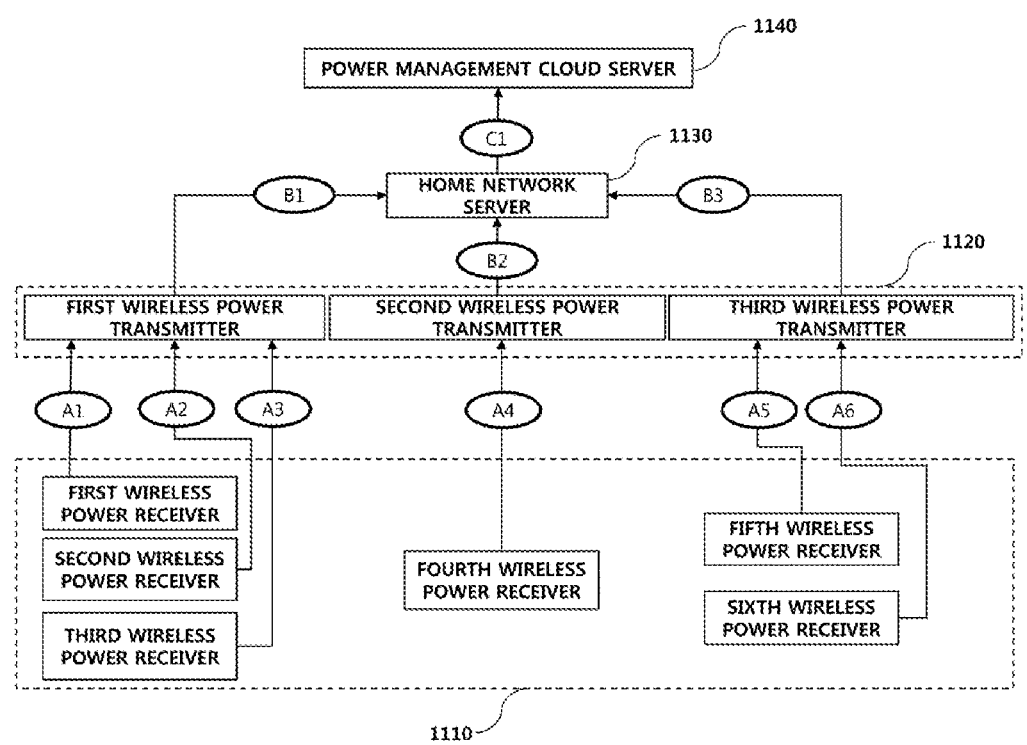
FIG. 11 is a diagram for explanation of an information collecting procedure in a wireless power management system according to an embodiment of the disclosure.

FIG. 11 is a diagram for explanation of an information collecting procedure in a wireless power management system according to an embodiment of the disclosure.

As illustrated in FIG. 11, the wireless power management system may include a plurality of wireless power receivers 1110 for transmitting state information items A1 to A6 to a connected wireless power transmitter in real time, a plurality of wireless power transmitters 1120 for wirelessly supplying power to the plurality of wireless power receivers 1110 and collecting state information from the connected wireless power receiver, a home network server 1130 for receiving state information of the wireless power receiver from a plurality of wireless power transmitters, and a power management cloud server 1140 for collecting information from the home network server 1130 and generating and maintaining statistical information for wireless power management. The aforementioned components of the wireless power management system are not a requirement and, thus, greater or fewer components may alternatively be implemented. For example, the wireless power management system may further include a customer terminal (not shown) that is operatively associated with the power management cloud server 1140 or may not include the power management cloud server 1140.

The state information items A1 to A6 of the wireless power receiver may include unique identification information—hereinafter, for convenience of description, referred to as receiver identification information—for identifying a user device including a corresponding wireless power receiver or wireless power receiver installed therein. Accordingly, the wireless power transmitter may statistically process and maintain power transmission efficiency, load charging efficiency, power consumption, etc. in a unit of a wireless power receiver.

In addition, information items B1 to B3 transmitted to the home network server 1130 by the wireless power transmitter 1120 may include unique identification information—hereinafter, for convenience of description, referred to as transmitter identification information—for identifying a corresponding wireless power transmitter.

In particular, the information items B1 to B3 may include various statistical information items that are internally calculated by the wireless power transmitter 1120 as well as state information received from the wireless power receiver 1110. For example, the statistical information that is internally calculated by the wireless power transmitter 1120 may include information on power consumption, which accumulates per unit time in a corresponding wireless power transmitter, information on average load charging efficiency of all wireless power receivers connected to the corresponding wireless power transmitter per unit time, statistical information on permission and denial of a power transmission request received from the corresponding wireless power transmitter per unit time, etc.

The home network server 1130 may transmit information C1 that is statistically processed based on information collected from the wireless power transmitter 1120 to the power management cloud server 1140. For example, the information that is statistically processed by the home network server 1130 may include amounts of power consumption—hereinafter, for convenience of description, referred to as a network power consumption amount—of all wireless power transmitters connected to a corresponding network per unit time. In addition, the home network server 1130 may transmit information on a user device that is completely charged to the power management cloud server 1140 on a corresponding network.

The power management cloud server 1140 may calculate cumulative electric charges during a unit period—e.g., including a time unit, a day unit, a week unit, a month unit, etc.—for each home network based on the collected network power consumption amount and may provide the calculated cumulative electric charges according to a request of a customer terminal (not shown).

The power management cloud server 1140 may identify a user device that is wirelessly and completely charged for each home network and transmit a predetermined wireless charging completion notification message to a predetermined customer terminal so as to correspond to the corresponding home network.

In addition, the power management cloud server 1140 may statistically process and maintain state information for each home network/wireless power transmitter/wireless power receiver and provide a predetermined user interface image for searching for the statistically processed state information. In this case, the user may access the power management cloud server 1140 through a user terminal and search for desired information.

In particular, the power management cloud server 1140 may identify a wireless power supply shadow area in a corresponding home network based on the statistical information collected from the home network server 1130 and transmit information on the identified wireless power supply shadow area to a corresponding customer terminal.

In addition, the power management cloud server 1140 may receive information on a current position of a user device and information on a wireless power transmitter to which the corresponding user device is connected from the user device through a wireless communication network. In this c case, the power management cloud server 1140 may identify the position of the corresponding wireless power transmitter through the current position of the user device that is being charged.

According to an embodiment of the disclosure, the wireless power transmitter may be fixedly installed in a specific area and/or place but this is merely an embodiment and, thus, a wireless power transmitter according to another embodiment of the disclosure may be installed in a moving element—e.g., a car, a train, a ship, a plane, etc.—or the like. In this case, it is noted that a position of the wireless power transmitter may be changed in real time and that the position of the wireless power transmitter may be predicated through a current position of a user device including a wireless power receiver that is being charged from the corresponding wireless power transmitter.

Figure 12:
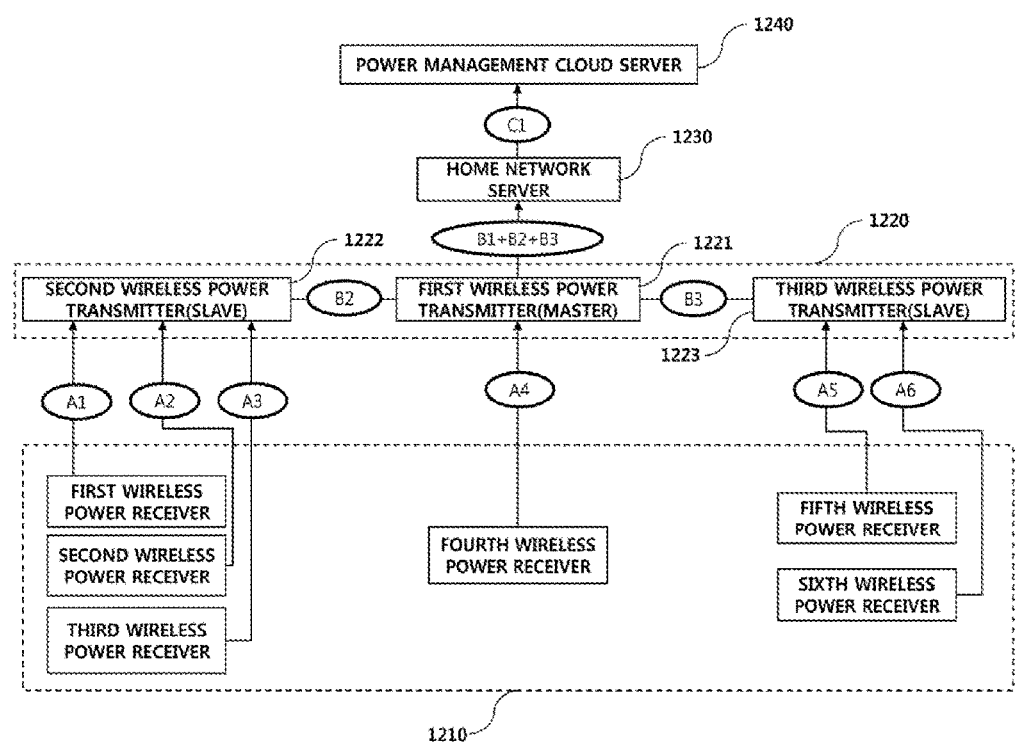
FIG. 12 is a diagram for explanation of an information collecting procedure in a wireless power management system according to another embodiment of the disclosure.

FIG. 12 is a diagram for explanation of an information collecting procedure in a wireless power management system according to another embodiment of the disclosure.

As illustrated in FIG. 12, wireless power transmitters constituting a home network for wireless power transmission may be operatively associated with each other via a master/slave configuration so as to exchange information.

Referring to FIG. 12, a first wireless power transmitter 1221 may operate as a master and may be operatively associated directly with a home network server 1230. On the other hand, a second wireless power transmitter 1222 and a third wireless power transmitter 1223 that are slaves may transmit the collected and statistically processed information items B2 and B3 to the first wireless power transmitter 1221 as a master. Continuously, the first wireless power transmitter 1221 may transmit the collected and statistically processed information B1 of the first wireless power transmitter 1221 and the information items B2 and B3 that are collected and statistically processed by adjacent wireless power transmitters 1222 and 1223 to the home network server 1230.

In this case, the first wireless power transmitter 1221 as a mater may control operations of the second wireless power transmitter 1222 and the third wireless power transmitter 1223 that are slaves. For example, the first wireless power transmitter 1221 may control handover on a corresponding home network. As another example, the first wireless power transmitter 1221 may control maximum output power of the second wireless power transmitter 1222 and the third wireless power transmitter 1223 that are slaves and the number of connectable wireless power receivers.

A description of an operation between the home network server 1230 and a power management cloud server 1240 is substituted with the above description of FIG. 11.

The wireless power management system according to another embodiment of the disclosure may not include the home network server 1230 and the power management cloud server 1240 that have been described with reference to FIG. 12.

As is apparent from the above description, the method and apparatus according to the disclosure have the following effects.

The embodiments of the disclosure may provide a method of managing power using a wireless charging system, and an apparatus and system therefor.

According to the embodiments of the disclosure, wireless power shadow area may be identified based on wireless charging efficiency collected in real time for each wireless power transmitter through a wireless charging system connected via a network so as to optimize a wireless charging system.

According to the embodiments of the disclosure, statistical information collected for each device through a wireless charging system connected via a network may be provided to a user.

The embodiments of the disclosure may provide a smart wireless power management method, and an apparatus and system therefor, for monitoring a wireless charging state of wireless charging device installed in home in real time.

It will be appreciated by persons skilled in the art that that the effects that could be achieved with the embodiments of the disclosure are not limited to what has been particularly described hereinabove and other advantages of the disclosure will be more clearly understood from the detailed description taken in conjunction with the accompanying drawings.

Those skilled in the art will appreciate that the embodiments of the disclosure may be carried out in other specific ways than those set forth herein without departing from the spirit and essential characteristics of the embodiments of the disclosure. The above embodiments are therefore to be construed in all aspects as illustrative and not restrictive. The scope of the embodiments of the disclosure should be determined by the appended claims and their legal equivalents, not by the above description, and all changes coming within the meaning and equivalency range of the appended claims are intended to be embraced therein.

The embodiments of the disclosure can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy discs, optical data storage devices, etc. and the computer readable recording medium is also embodied in the form of a carrier wave (e.g., transmission through the Internet).

The computer readable recording medium can also be distributed over network coupled computer systems so that the computer readable code is stored and executed in a distributed fashion. Also, functional programs, codes, and code segments for accomplishing the embodiments of the disclosure can be easily construed by programmers skilled in the art to which the embodiments of the disclosure pertain.

Those skilled in the art will appreciate that the embodiments of the disclosure may be carried out in other specific ways than those set forth herein without departing from the spirit and essential characteristics of the embodiments of the disclosure.

The above embodiments are therefore to be construed in all aspects as illustrative and not restrictive. The scope of the embodiments of the disclosure should be determined by the appended claims and their legal equivalents, not by the above description, and all changes coming within the meaning and equivalency range of the appended claims are intended to be embraced therein.

The embodiments of the disclosure may be used in wireless charging fields and, in particular, applied to a wireless charging system that requires wireless power management.

What is claimed is:

1. A wireless power management method in a wireless power transmitter for supplying power to at least one user device comprising a wireless power receiver installed therein, the method comprising:
   receiving first to $n^{th}$ state information items corresponding to the at least one user device, respectively;
   calculating first statistical information based on the first to $n^{th}$ state information items; and
   transmitting the first statistical information to a server connected via a network.

2. The method according to claim 1, wherein:
   the first statistical information is collected in a unit of the user device; and
   the information collected in a unit of the user device comprises at least one of information on power consumption per unit time, information on load charging efficiency, information on a current charge of the load, and information on estimated time of charging completion of the load.

3. The method according to claim 2, wherein:
   the first statistical information is further collected in a unit of the wireless power transmitter; and
   the information collected in a unit of the wireless power transmitter comprises at least one of information on average power transmission efficiency per unit time, information on average charging efficiency of all user devices connected per unit time; information on a whole power amount output from the wireless power transmitter per unit time, and statistical information on permission and denial of a power transmission request from the user device.

4. The method according to claim 3, further comprising determining whether an area corresponding to the wireless power transmitter is a shadow area based on the information collected in a unit of the wireless power transmitter.

5. The method according to claim 4, wherein the shadow area is determined by any one of the server and the wireless power transmitter.

6. The method according to claim 3, further comprising determining whether the wireless power transmitter is added/removed/changed to/from/to a home network with the wireless power transmitter connected thereto based on the information collected in a unit of the wireless power transmitter.

7. The method according to claim 3, further comprising controlling at least one of maximum output power of the wireless power transmitter and a maximum number of connectable wireless power receivers of the wireless power transmitter based on the information collected in a unit of the wireless power transmitter.

8. The method according to claim 1, wherein the state information comprises at least one of information on intensity of power applied to the user device, information on intensity of power at a rear end of a rectifier of the wireless power receiver, charging state information, system error information, information on a maximum charge of a load, and information on a current charge of the load.

9. The method according to claim 1, wherein the wireless power transmitter transmits the power using at least one of a magnetic induction method, an electromagnetic resonance method, and a radio frequency (RF) method.

10. The method according to claim 1, further comprising receiving second to $k^{th}$ statistical information items corresponding to adjacent wireless power transmitters connected to the network,
wherein power consumption and estimated electric charges during a unit period corresponding to the network are calculated based on the first to $k^{th}$ statistical information items.

11. A wireless power management method in a server connected to at least one wireless power transmitter through a home network, the method comprising:
receiving statistical information collected by each wireless power transmitter;
determining a wireless power supply shadow area based on the statistical information; and
transmitting a result of the determining to a predetermined customer terminal.

12. The method according to claim 11, wherein the statistical information comprises information collected in a unit a user device for wirelessly receiving power from the wireless power transmitter.

13. The method according to claim 12, wherein the information collected in a unit of the user device comprises at least one of:
a number of times that a power transmission request is received per unit time;
information on power consumption per unit time;
information on load charging efficiency;
information on a current charge of the load; and
information on estimated time of charging completion of the load.

14. The method according to claim 13, wherein the statistical information is calculated based on the information collected in a unit of the user device and comprises at least one of information on average power transmission efficiency per unit time, information on average charging efficiency of all user devices connected to the wireless power transmitter per unit time, information on a whole power amount output from the wireless power transmitter per unit time, and statistical information on permission and denial of a power transmission request from the user device.

15. The method according to claim 13, further comprising:
identifying a complexly charged user device based on the statistical information; and
transmitting a result of the identifying to the customer terminal.

16. The method according to claim 13, further comprising controlling maximum output power of the wireless power transmitter based on the statistical information.

17. The method according to claim 13, further comprising calculating power consumption and estimated electric charges during a unit period corresponding to the network using the statistical information.

18. A wireless power transmitter for wirelessly supplying power to at least one user device comprising a wireless power receiver installed therein, comprising:
a first communicator configured to receive first to $n^{th}$ state information items corresponding to the at least one user device, respectively;
a controller configured to calculate first statistical information based on the first to $n^{th}$ state information items; and
a second communicator configured to transmit the first statistical information to a server connected via a network.

19. A wireless power management apparatus connected to at least one wireless power transmitter through a home network, the apparatus comprising:
a device configured to receive statistical information collected by each wireless power transmitter;
a device configured to determine a wireless power supply shadow area based on the statistical information; and
a device configured to transmit a result of the determining to a predetermined customer terminal.

20. A wireless power management system comprising:
first to $n^{th}$ wireless power receivers configured to wirelessly receive power;
first to $k^{th}$ wireless power transmitters configure to supply the power to the first to $n^{th}$ wireless power receivers and to receive state information from the first to $n^{th}$ wireless power receivers to generate statistical information; and
a server configured to determine a wireless power supply shadow area based on the statistical information received from the first to $k^{th}$ wireless power transmitters.

* * * * *